(12) United States Patent
Zhou et al.

(10) Patent No.: US 8,709,601 B2
(45) Date of Patent: Apr. 29, 2014

(54) BLOCK COPOLYMER NANOPARTICLE COMPOSITIONS

(75) Inventors: Zhang-Lin Zhou, Palo Alto, CA (US);
Sivapackia Ganapathiappan, Los Altos, CA (US); Gary Gibson, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 294 days.

(21) Appl. No.: 13/146,401

(22) PCT Filed: Jan. 30, 2009

(86) PCT No.: PCT/US2009/032508
§ 371 (c)(1),
(2), (4) Date: Jul. 26, 2011

(87) PCT Pub. No.: WO2010/087841
PCT Pub. Date: Aug. 5, 2010

(65) Prior Publication Data
US 2011/0281103 A1    Nov. 17, 2011

(51) Int. Cl.
*B32B 5/16*        (2006.01)
*B05D 7/00*        (2006.01)

(52) U.S. Cl.
USPC .......................................... 428/407; 427/221

(58) Field of Classification Search
USPC .......................................... 428/407; 427/221
See application file for complete search history.

(56) References Cited

U.S. PATENT DOCUMENTS

| | | | |
|---|---|---|---|
| 5,569,448 A * | 10/1996 | Wong et al. | 424/9.45 |
| 5,807,974 A | 9/1998 | Kim | |
| 5,876,864 A | 3/1999 | Kim | |
| 5,998,045 A | 12/1999 | Chen | |
| 6,312,839 B1 | 11/2001 | Kim | |
| 6,353,083 B1 | 3/2002 | Inbasekaran | |
| 6,491,903 B1 * | 12/2002 | Forster et al. | 424/78.01 |

(Continued)

FOREIGN PATENT DOCUMENTS

| | | |
|---|---|---|
| JP | 2008218983 A | 9/2008 |
| KR | 20060016413 A | 2/2006 |

(Continued)

OTHER PUBLICATIONS

Iijima et al., Surface modification for improving the stability of nanoparticles in liquid media, KONA Powder and Particle Journal, No. 27 (2009).*

(Continued)

*Primary Examiner* — Hoa (Holly) Le

(57) ABSTRACT

Copolymers and methods using the copolymers control the stability, the homogeneity of mixtures and the chargeability of a nanoparticle. A block copolymer-nanoparticle composition includes first, second and third block units that each include repeating units of respective monomers. The monomer of the first block unit includes a binding group that binds to the nanoparticle. The monomer of the second block unit includes a hydrophobic moiety that provides steric stabilization of the nanoparticle and homogeneity of mixtures of the copolymer-nanoparticle composition in a non-polar medium. The monomer of the third block unit includes a chargeable group that imparts a charge to the nanoparticle. An order of the respective block units in the copolymer and the number of repeating units of the monomer in the respective block units control the stability, the homogeneity of mixtures and the charge of the nanoparticle.

15 Claims, 4 Drawing Sheets

Tri-block Copolymer

XV
Covalently Bonded
NP-Block Copolymer Composition

XXI
Charged and Stable NP-Block Copolymer Composition
Dispersed in a Non-polar Medium

(56) References Cited

U.S. PATENT DOCUMENTS

| | | |
|---|---|---|
| 6,815,505 B2 | 11/2004 | Wu |
| 6,830,830 B2 | 12/2004 | Hsieh |
| 6,887,972 B2 | 5/2005 | Huang et al. |
| 7,057,009 B2 | 6/2006 | Chen |
| 7,172,811 B2 | 2/2007 | Denisyuk |
| 7,217,824 B2 | 5/2007 | Zhang |
| 2001/0012572 A1 | 8/2001 | Araki |
| 2002/0123550 A1 | 9/2002 | Border et al. |
| 2003/0039838 A1 | 2/2003 | Chen |
| 2003/0045642 A1 | 3/2003 | Wu |
| 2003/0099838 A1 | 5/2003 | Cho et al. |
| 2003/0207152 A1 | 11/2003 | Hsieh |
| 2003/0227001 A1 | 12/2003 | Li |
| 2004/0013904 A1 | 1/2004 | Cina |
| 2004/0079924 A1 | 4/2004 | Kwag |
| 2004/0166366 A1 | 8/2004 | Cho |
| 2004/0229925 A1 | 11/2004 | Zhang |
| 2005/0070654 A1 | 3/2005 | Hsu |
| 2005/0189873 A1 | 9/2005 | Kelly |
| 2005/0221124 A1 | 10/2005 | Hwang |
| 2006/0159956 A1 | 7/2006 | Ito |
| 2007/0111029 A1 | 5/2007 | Yamada |
| 2007/0154736 A1 | 7/2007 | Cina |
| 2007/0232841 A1 | 10/2007 | Igawa |
| 2007/0254996 A1 | 11/2007 | Nauka |
| 2008/0152946 A1 | 6/2008 | Yen |
| 2008/0200736 A1 | 8/2008 | Kosuge |
| 2008/0220289 A1 | 9/2008 | Shioya |
| 2008/0249282 A1 | 10/2008 | Carter |
| 2009/0227711 A1* | 9/2009 | Carlini et al. .......... 524/90 |

FOREIGN PATENT DOCUMENTS

| | | |
|---|---|---|
| WO | 2005049548 A1 | 6/2005 |
| WO | 2005085339 A1 | 9/2005 |
| WO | 2005104213 A2 | 11/2005 |

OTHER PUBLICATIONS

Shi, Steric Stabilization, Center for Industrial Sensors and Measurements, Aug. 29, 2002.*

International Search Report (ISR) and Written Opinion of the International Searching Authority (ISA) mailed Oct. 21, 2009 from ISA/KR for counterpart PCT Application No. PCT/US2009/032508 (10 pages).

Saleh et al, "Adsorbed Triblock Copolymers Deliver Reactive Iron Nanoparticles to the Oil/Water Interface," Nano Letters, vol. 5, No. 12, 2005, pp. 2489-2494.

Harris et al., "Magnetitie Nanoparticle Dispersions Stabilized with Triblock Copolymers," Chem. Matters, vol. 15, 2003, pp. 1367-1377.

Mu et al., "Well-defined Dendritic-Graft Copolymer Grafted Silica Nanoparticle by Consecutive Surface-Initiated Atom Transfer Radical Polymerizations," Ind. Eng. Chem. Res., vol. 46, 2007, 3069-3072.

* cited by examiner

XVI
Covalently Bonded
NP-Block Copolymer Composition

XXII
Charged and Stable NP-Block Copolymer Composition
Dispersed in a Non-polar Medium XVIIIA
Covalently Bonded
NP-Block Copolymer Composition XXIII
Charged and Stable NP-Block Copolymer Composition
Dispersed in a Non-polar Medium

BLOCK COPOLYMER NANOPARTICLE COMPOSITIONS

CROSS-REFERENCE TO RELATED APPLICATIONS

N/A

STATEMENT REGARDING FEDERALLY SPONSORED RESEARCH OR DEVELOPMENT

N/A

BACKGROUND

1. Technical Field

This invention relates to polymers and polymer-particle compositions, to devices employing the polymer-particle compositions and to methods for preparing polymer-particle compositions.

2. Description of Related Art

Ultrathin, flexible electronic displays that look like print on paper are of great interest for potential applications in wearable computer screens, electronic paper and smart identity cards. Electrophoretic display is an important approach to this type of medium. Electrophoretic actuation relies on particles moving under the influence of an electric field, so the desired particles must exhibit good dispersibility and charge properties in non-polar dispersing media. Non-polar dispersing media are desirable for dispersing particles for electrophoretic displays because such media help minimize the leakage currents in electrophoretic devices. However, such particles do not readily exhibit the properties that are conducive to a non-polar dispersing medium.

SUMMARY

An embodiment of the present invention is a block copolymer-nanoparticle composition that comprises a nanoparticle having bound thereto a copolymer. The copolymer comprises first, second and third block units. The first block unit comprises repeating units of a monomer comprising a binding group that is bound to the nanoparticle. The second block unit comprises repeating units of a monomer comprising a hydrophobic moiety that provides steric stabilization of the nanoparticle and homogeneity of mixtures of the copolymer-nanoparticle composition in a non-polar medium. The third block unit comprises repeating units of a monomer comprising a chargeable group that imparts a charge to the nanoparticle. The order of the respective block units in the copolymer and the number of repeating units of the monomer in the respective block units control the stability, the homogeneity of mixtures and the charge of the nanoparticle in a non-polar medium.

Another embodiment of the present invention is a method of controlling stability, homogeneity of mixtures in a non-polar medium and chargeability of a nanoparticle. The method comprises combining in a non-polar medium a nanoparticle and a block copolymer. The copolymer comprises a first block unit that comprises repeating units of a monomer comprising a binding group that binds to the nanoparticle, a second block unit that comprises repeating units of a monomer comprising a hydrophobic moiety that provides steric stabilization and homogeneity of mixtures of the nanoparticle in the non-polar medium, and a third block unit that comprises repeating units of a monomer comprising a chargeable group that imparts a charge to the nanoparticle. The order of the respective block units in the copolymer and the number of repeating units of the monomer in the respective block units control the stability, the homogeneity of mixtures and the charge of the nanoparticle.

Another embodiment of the present invention is a device comprising at least two conductive plates, wherein the conductive plates are separately activatable by one or more voltage sources, and a block copolymer-nanoparticle composition in a non-polar medium between the conductive plates. The block copolymer-nanoparticle composition comprises nanoparticles each having bound thereto one or more copolymers. The copolymer comprises first, second and third block units. The first block unit comprises repeating units of a monomer comprising a binding group that is bound to the nanoparticle. The second block unit comprises repeating units of a monomer comprising a hydrophobic moiety that provides steric stabilization of the nanoparticle and homogeneity of mixtures of the polymer-nanoparticle composition in the non-polar medium. The third block unit comprises repeating units of a monomer comprising a chargeable group that imparts a charge to the nanoparticle. The order of the respective block units in the copolymer and the number of repeating units of the monomer in the respective block units control the stability, the homogeneity of mixtures and the charge of the nanoparticle in the non-polar medium.

BRIEF DESCRIPTION OF THE DRAWINGS

The drawings provided herein are for the purpose of facilitating the understanding of certain embodiments of the present invention and are provided by way of illustration and not limitation on the scope of the appended claims.

DETAILED DESCRIPTION

General Discussion

Figure 1:
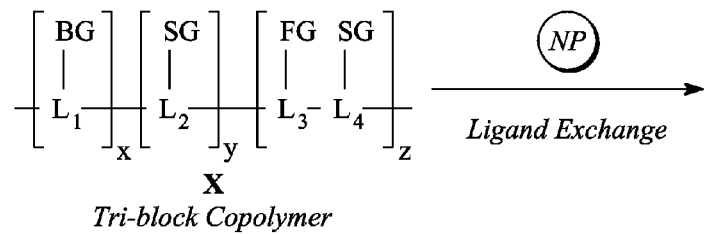
FIG. 1 is a scheme depicting a method of making a charged functionalized tri-block copolymer-nanoparticle composition in accordance with an embodiment of the present invention.
Figure 1:
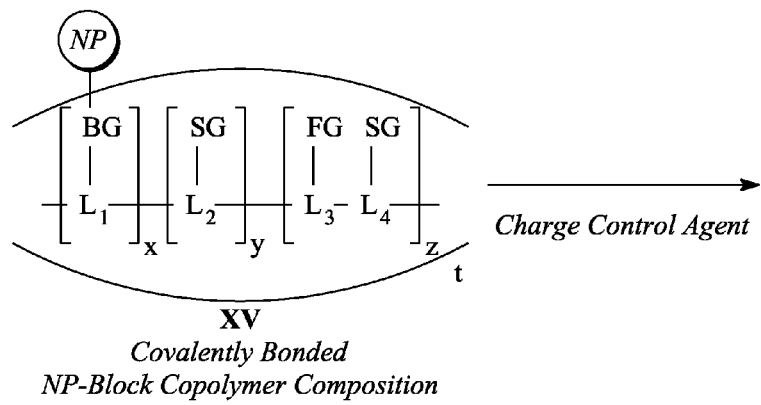
Figure 1:
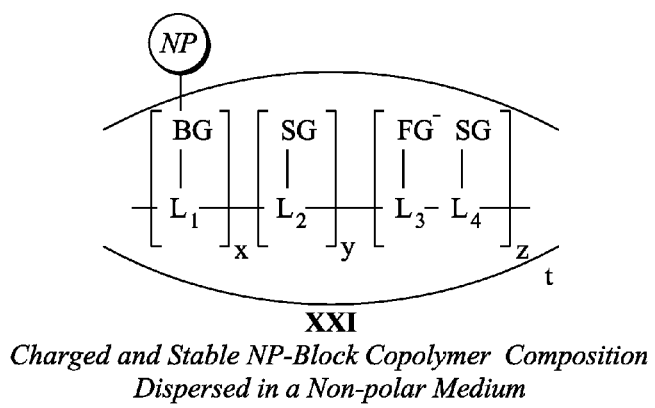

Embodiments of the present methods and compositions are concerned with enhancing the stability of, the homogeneity of mixtures containing, and the charge of nanoparticles, such as nanoparticles in a non-polar medium. In such embodiments, block copolymers are employed for binding to the nanoparticles where the blocks of the copolymers are functionalized to bind to the nanoparticles, to stabilize the nanoparticles and to control the homogeneity of mixtures of the nanoparticles in a non-polar medium as well as to impart a charge to the nanoparticles in the non-polar medium to, for example, enable electrophoretic motion of the nanoparticles. In some embodiments, the copolymer is a tri-block copolymer that comprises first, second and third block units. The first block unit comprises repeating units of a monomer comprising a binding group that binds to the nanoparticles. The second block unit comprises repeating units of a monomer comprising a hydrophobic moiety that provides steric stabilization and homogeneity of mixtures of the nanoparticles. The third block unit comprises repeating units of a monomer comprising a chargeable group that imparts a charge to the nanoparticles. The order of the block units in the copolymer and the number of units of monomer in each block unit control the stability, the homogeneity of mixtures of the particles in a non-polar medium and the charge of the particle. The number of units of monomer in each block unit may be controlled by controlling the molar concentration of the monomer units.

Specific Embodiments of Polymers

In some embodiments, the aforementioned block copolymers comprise blocks of repeating monomer units and is of the formula:

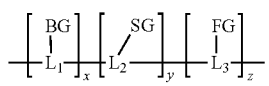

I wherein:

BG is a binding group that binds to the nanoparticle, $L_1$, $L_2$ and $L_3$ are each independently a portion of a polymer backbone, x, y and z are integers independently between 1 and about 5,000, SG is a hydrophobic moiety that provides steric stabilization and homogeneity of mixtures of the nanoparticle, and FG is a functional group that imparts a charge to the nanoparticle.

As indicated above, the function of BG is to bind to a nanoparticle. BG may be any functional group or structure that can either coordinate with or form a covalent bond with the particles so as to be chemically attached to the nanoparticles. The nature of BG is dependent on the nature and chemical composition of the nanoparticle, the nature of any linking groups, and the like. As mentioned above, BG may bind to a nanoparticle by a covalent bond or by a chemical complex. A covalent bond is characterized by the sharing of electrons, usually pairs of electrons, between atoms or between atoms and other covalent bonds. A chemical complex is characterized by the donation of electrons from a lone electron pair into, for example, an empty orbital of a metal. Such a bond is sometimes referred to as a coordinate covalent bond. The electron donor is referred to as a ligand and the resulting complex is referred to as a coordination compound. Most metals and metal ions exist surrounded by ligands and the ligands are coordinated to the metal or metal ion. Accordingly, BG may bind to the nanoparticle by means of ligand exchange or covalent bonding.

In some embodiments, the polymer backbone comprises an alkylene or an alkenylene chain. One or more carbon atoms of the chain may be replaced by a heteroatom with the resulting molecule being a heteroatom counterpart of the alkylene or the alkenylene. Furthermore, one or more of the hydrogen atoms of the carbon atoms of the chain may be replaced by an aliphatic or aromatic group, which may be, for example, alkyl, substituted alkyl, alkenyl, substituted alkenyl, alkynyl, substituted alkynyl, heteroalkyl, heteroalkenyl, heteroalkynyl, substituted heteroalkyl, substituted heteroalkenyl, substituted heteroalkynyl, aryl, heteroaryl (such as, e.g., aryloxy, thioaryl, and the like), substituted aryl, substituted heteroaryl, or a combination thereof. In some embodiments, the polymer backbone has phenyl or substituted phenyl substituents, which depend from the backbone. In some embodiments, the substituted phenyl substituents include, for example, phenyl substituted in an ortho, meta or para position with alkyl, which, in some embodiments, is lower alkyl.

BG may be directly attached to an atom of a polymer backbone or it may be attached by means of a linking group that links BG to the polymer backbone. The linking groups may comprise 1 to about 100 atoms, or 1 to about 70 atoms, or 1 to about 50 atoms, or 1 to about 20 atoms, or 1 to about 10 atoms, or 2 to about 10 atoms, or 2 to about 20 atoms, or 3 to about 10 atoms, or about 3 to about 20 atoms, or 4 to about 10 atoms, or 4 to about 20 atoms, or 5 to about 10 atoms, or about 5 to about 20 atoms. The atoms are each independently selected from the group normally consisting of carbon and heteroatoms such as, for example, oxygen, sulfur, nitrogen, halogen and phosphorous. The number of heteroatoms in the linking groups should not be such as to interfere with the hydrophobicity of a polymer-particle composition, as discussed in more detail below. The number of heteroatoms in the linking group may range from 0 to about 20, or from 1 to about 15, or from 1 to about 6, or from 1 to about 5, or from 1 to about 4, or from 1 to about 3, or from 1 to 2, or from 0 to about 5, or from 0 to about 4, or from 0 to about 3, or from 0 to 2 or from 0 to 1. The length of a particular linking group can be selected to provide for convenience of synthesis and the incorporation of the desired BG group into the polymer matrix and for sufficient binding of BG to a particle. The linking groups may be aliphatic or aromatic and may be, for example, alkylene, substituted alkylene, alkylenoxy, substituted alkylenoxy, thioalkylene, substituted thioalkylene, alkenylene, substituted alkenylene, alkenylenoxy, substituted alkenylenoxy, thioalkenylene, substituted thioalkenylene, alkynylene, substituted alkynylene, alkynylenoxy, substituted alkynylenoxy, thioalkynylene, substituted thioalkynylene, arylene, substituted arylene, arylenoxy, thioarylene, and counterparts thereof comprising one or more heteroatoms. The length of the linking group in some embodiments is about 2 to about 10 atoms, or about 2 to about 9 atoms, or about 2 to about 8 atoms, or about 2 to about 7 atoms, or about 2 to about 6 atoms, or about 2 to about 5 atoms, or about 2 to about 4 atoms. In some embodiments, the linking group is not, or does not comprise, a carbon-carbon double bond or a carbon-carbon triple bond.

The composition and length of the linking group should be such as to not interfere with the binding of BG to a particle or with the functions of SG and FG. The linking group should be hydrophobic to the extent that the homogeneity of mixtures of the particle in a non-polar medium is not compromised. Furthermore, the chemistry used to introduce the linking group should not be detrimental to the molecule in question. The linking group may be introduced into the monomeric unit by means of a functional group that covalently binds to a corresponding functional group on the monomeric unit. Such functional groups may be selected from the same functional groups as that for BG.

By way of example and not limitation, the functional groups may include at least one electron pair donor group (which may be electrically neutral or negatively charged). Electron pair donor groups often include atoms such as, for example, O, N, S, and P as well as groups such as, for example, $P{=}O$, $S{=}O$, and the like. By way of example and not limitation, the binding group BG may include a primary, secondary or tertiary amine or amide group, a nitrile group, an isonitrile group, a cyanate group, an isocyanate group, a thiocyanate group, an isothiocyanate group, an azide group, a thio group, a thiolate group, a sulfide group, a sulfinate group, a sulfonate group, a phosphate group, a hydroxyl group, an alcoholate group, a phenolate group, a carbonyl group, a carboxylate group, a phosphine group, a phosphine oxide group, a phosphonic acid group, a phosphoramide group, a phosphate group, a phosphite group, as well as combinations and mixtures of such groups.

One of the aforementioned functional groups may react with a corresponding functional group on a particle, which functional group is present on the particle or introduced on the surface of the particle. In one embodiment, ligands can be provided and chemically attached to the particle. The ligands may include a binding group that is configured to form a chemical bond or a chemical complex with a particle. The ligands may also include a functional group that is configured to react with BG, which is, therefore, a complementary functional group. The particles having the ligands bound thereto then may be mixed with the molecules of the polymer, and the complementary functional groups react with one another to form a covalent bond.

Examples of ligands, by way of illustration and not limitation, include difunctional ligands such as amino acids, for example, alanine, cysteine, glycine, and the like; aminoaliphatic acids, aminoaromatic acids, aminoaliphatic thiols, aminoaromatic thiols, and the like.

By way of illustration and not limitation, one of BG or the functional group on the particle may include a nucleophile (such as, for example, amines, alcohols, thiols, etc.), and the other of BG or the functional group on the particle may include a functional group capable of reacting with a nucleophile (such as, for example, aldehydes, isocyanates, isothiocyanates, succinimidyl esters, sulfonyl chlorides, epoxides, bromides, chlorides, iodides, and maleimides). Examples, by way of illustration and not limitation, of the reaction products of corresponding functionalities of BG and the particle include amides, amidines and phosphoramides, respectively, from reaction of amine and carboxylic acid or its nitrogen derivative or phosphoric acid (including esters thereof such as, for example, a succinimidyl ester and the like); thioethers from reaction of a mercaptan or thiol and an activated olefin or a mercaptan or a thiol and an alkylating agent; alkylamine from reaction of an aldehyde and an amine under reducing conditions; esters from the reaction of a carboxylic acid or phosphate acid and an alcohol; imines from reaction of an amine and an aldehyde; and so forth.

SG is a moiety that provides for steric stabilization and homogeneity of mixtures of the particles in a non-polar medium. For the most part, SG is hydrophobic and is sterically bulky. The degree of hydrophobicity of SG is that sufficient to enhance, in a non-polar medium, the homogeneity of particles, to which the polymer is bound. The degree of hydrophobicity is dependent on the nature of the non-polar medium, the nature of SG, and so forth. Steric stabilization of the particles means that the ability of the particles to stick together or coagulate is substantially reduced or eliminated particularly when the particles are in a non-polar medium. As a result, the homogeneity of a mixture of the particles in a non-polar medium is enhanced as discussed more fully below. The phrase "mixture of particles in a non-polar medium" refers to particles of the same composition, or particles of more than one composition, i.e., two or more different particles, mixed with a non-polar medium. The term "hydrophobic" or "hydrophobicity" refers to a molecule that is non-polar and thus prefers neutral molecules or non-polar molecules and prefers non-polar solvents. Hydrophobic molecules have an affinity for other hydrophobic moieties compared to hydrophilic moieties.

The copolymer-nanoparticle compositions form homogeneous mixtures in a non-polar medium by virtue of the hydrophobic nature of the SG moiety. In the context of the present embodiments, the homogeneity of a mixture of the copolymer-nanoparticle compositions in the non-polar medium may be actual or apparent. The homogeneity of the mixture in the non-polar medium is actual when the polymer-particle composition is soluble in the non-polar medium, which means that the polymer-particle composition exhibits a certain amount, usually a maximum amount, of solubility in a certain volume of solvent at a specified temperature. The homogeneity of the mixture of the polymer-particle composition in a non-polar medium is apparent when the polymer-particle composition is dispersed in the non-polar medium such that the mixture exhibits apparent homogeneity but the mixture is microscopically heterogeneous. Apparent homogeneity may also be referred to as a dispersion. Whether the homogeneity of the mixture of the polymer-particle composition is actual or apparent is dependent on the nature of the particle, the nature of the non-polar medium, and so forth. Steric stabilization of the particles, which results from the hydrophobicity of SG in the present embodiments, reduces the ability of the particles to stick together in a non-polar medium, thus providing enhanced homogeneity. The present copolymers render the copolymer-particle composition compatible with a non-polar medium.

The phrase "non-polar medium" means that the medium is primarily hydrocarbon in nature. In some embodiments, the medium is preferably environmentally compatible having little or no toxicity. Examples of non-polar media, by way of illustration and not limitation, include hydrocarbons containing 1 to about 30 carbon atoms, or 1 to about 20 carbon atoms, or 1 to about 10 carbon atoms, or 5 to about 30 carbon atoms, or 5 to about 20 carbon atoms, or 5 to about 10 carbon atoms, or 10 to about 30 carbon atoms, or 10 to about 20 carbon atoms, and so forth. The hydrocarbon may comprise one or more heteroatoms such as, for example, oxygen, nitrogen, sulfur, and the like provided that the presence of the heteroatoms does not significantly alter the hydrophobicity and environmental compatibility of the medium. The hydrocarbon may comprise atoms other than heteroatoms such as halogens or halo substituents, and the like provided that the presence of such atoms does not significantly alter the hydrophobicity and environmental compatibility of the medium.

As mentioned above, SG is also a sterically bulky group that provides stability to a polymer-particle composition. The term "stability" refers to the ability of such copolymer-nanoparticle compositions to remain in the non-polar medium, without aggregating in and/or precipitating out from the solution, for an extended period such as, for example, about 1 day to about 4 years, or about 1 day to about 3 years, or about 1 day to about 2 years, or about 1 day to about 1 year, or about 1 day to about 150 days, or about 1 day to about 100 days, or about 5 days to about 4 years, or about 5 days to about 3 years, or about 5 days to about 2 years, or about 5 days to about 1 year, or about 5 days to about 150 days, or about 5 days to about 100 days, and so forth. In some embodiments, SG is alkyl, substituted alkyl, heteroalkyl (e.g., alkoxy, substituted alkoxy, thioalkyl, substituted thioalkyl), alkenyl, substituted alkenyl, heteroalkenyl (e.g., alkenoxy, substituted alkenoxy, thioalkenyl, substituted thioalkenyl), alkynyl, substituted alkynyl, heteroalkynyl (e.g., alkynoxy, substituted alkynoxy, thioalkynyl, substituted thioalkynyl), aryl, substituted aryl, heteroaryl (e.g., aryloxy, substituted aryloxy, thioaryl, substituted thioaryl). SG may be branched or unbranched. The number of carbon atoms in SG is about 5 to about 50 carbon atoms, or about 5 to about 45 carbon atoms, or about 5 to about 40 carbon atoms, or about 5 to about 35 carbon atoms, or about 5 to about 30 carbon atoms, or about 5 to about 25 carbon atoms, or about 5 to about 20 carbon atoms, or about 5 to about 15 carbon atoms, or about 5 to about 10 carbon atoms, or about 10 to about 45 carbon atoms, or about 10 to about 40 carbon atoms, or about 10 to about 35 carbon atoms, or about 10 to about 30 carbon atoms, or about 10 to about 25 carbon atoms, or about 10 to about 20 carbon atoms, or about 10 to about 15 carbon atoms, or about 15 to about 45 carbon atoms, or about 15 to about 40 carbon atoms, or about 15 to about 35 carbon atoms, or about 15 to about 30 carbon atoms, or about 15 to about 25 carbon atoms, or about 15 to about 20 carbon atoms, or about 20 to about 45 carbon atoms, or about 20 to about 40 carbon atoms, or about 20 to about 35 carbon atoms, or about 20 to about 30 carbon atoms, or about 20 to about 25 carbon atoms, or about 25 to about 45 carbon atoms, or about 25 to about 40 carbon atoms, or about 25 to about 35 carbon atoms, or about 25 to about 30 carbon atoms, and so forth.

$L_1$, $L_2$, $L_3$ and $L_4$ (below) are each independently a portion of a polymer backbone from which the respective BG, SG and FG depend either directly through a bond or indirectly through a linking group. In some embodiments, $L_1$, $L_2$, $L_3$ and $L_4$ do not comprise a double bond or a triple bond. In some embodiments $L_1$, $L_2$, $L_3$ and $L_4$ are each independently selected from the group consisting of:

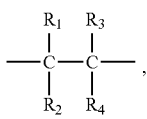

II

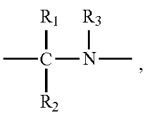

III

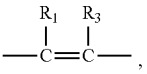

IV

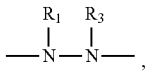

V wherein:
$R_1$, $R_2$, $R_3$, $R_4$ are each independently selected from the group consisting of hydrogen, alkyl, substituted alkyl, heteroalkyl (e.g., alkoxy, substituted alkoxy, thioalkyl, substituted thioalkyl), alkyl, substituted alkenyl, heteroalkenyl (e.g., alkenoxy, substituted alkenoxy, thioalkenyl, substituted thioalkenyl), alkynyl, substituted alkynyl, heteroalkynyl (e.g., alkynoxy, substituted alkynoxy, thioalkynyl, substituted thioalkynyl), aryl, substituted aryl, heteroaryl (e.g., aryloxy, substituted aryloxy, thioaryl, substituted thioaryl), and
at least one of $R_1$, $R_2$, $R_3$ and $R_4$ is BG, SG, or FG for each of $L_1$, $L_2$ and $L_3$, and
wherein in some embodiments, $R_1$ and $R_3$ in one or more of III, IV and V may be taken together to form a bond (—($R_2$)C═N—, —C≡C—, and —N═N—, respectively).

In some embodiments, the polymer is a tri-block polymer wherein each block comprises repeating monomeric units selected from the group consisting of:

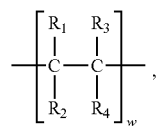

VI

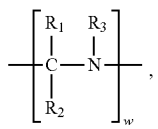

VII

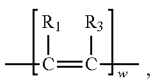

VIII

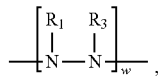

IX wherein:
$R_1$, $R_2$, $R_3$, $R_4$ are each independently selected from the group consisting of hydrogen, alkyl, substituted alkyl, heteroalkyl (e.g., alkoxy, substituted alkoxy, thioalkyl, substituted thioalkyl), alkyl, substituted alkenyl, heteroalkenyl (e.g., alkenoxy, substituted alkenoxy, thioalkenyl, substituted thioalkenyl), alkynyl, substituted alkynyl, heteroalkynyl (e.g., alkynoxy, substituted alkynoxy, thioalkynyl, substituted thioalkynyl), aryl, substituted aryl, heteroaryl (e.g., aryloxy, substituted aryloxy, thioaryl, substituted thioaryl),
at least one of $R_1$, $R_2$, $R_3$ and $R_4$ is BG, SG, or FG for each of $L_1$, $L_2$ and $L_3$, and
w is x, y or z and is the same or different for each of $L_1$, $L_2$ and $L_3$, and
wherein in some embodiments, $R_1$ and $R_3$ in one or more of VII, VIII and IX may be taken together to form a bond (—[($R_2$)C═N]$_w$—, —[C≡C]$_w$—, and —[N═N]$_w$—, respectively).

In some embodiments x, y and z are integers independently between 1 and about 5000, or between 1 and about 4000, or between 1 and about 3000, or between 1 and about 2000, or between 1 and about 1000, or between 1 and about 500, or between 1 and about 100, or between about 5 and about 4000, or between about 5 and about 3000, or between about 5 and about 2000, or between about 5 and about 1000, or between about 5 and about 500, or between about 5 and about 100, or between about 10 and about 4000, or between about 10 and about 3000, or between about 10 and about 2000, or between about 10 and about 1000, or between about 10 and about 500, or between about 10 and about 100, or between about 20 and about 4000, or between about 20 and about 3000, or between about 20 and about 2000, or between about 20 and about 1000, or between about 20 and about 500, or between about 20 and about 100, or between about 50 and about 4000, or between about 50 and about 3000, or between about 50 and about 2000, or between about 50 and about 1000, or between about 50 and about 500, or between about 50 and about 100, or between about 100 and about 4000, or between about 100 and about 3000, or between about 100 and about 2000, or between about 100 and about 1000, or between about 100 and about 500, or between about 200 and about 4000, or between about 200 and about 3000, or between about 200 and about 2000, or between about 200 and about 1000, or between about 200 and about 500, or between about 500 and about 4000, or between about 500 and about 3000, or between about 500 and about 2000, or between about 500 and about 1000, or between about 1000 and about 4000, or between about 1000 and about 3000, or between about 1000 and about 2000, and the like.

FG is a functional group that is a chargeable group having the ability to impart a charge to the particle. FG is chargeable in that it is capable of being treated with a charge-directing moiety to render it a charged group, either positively charged or negatively charged. The charge-directing moiety is a molecule or compound that reacts with FG to render FG charged. In some embodiments, FG is an acidic functionality or a basic functionality. An acidic functionality is one that is capable of being treated with a basic moiety, as the charge-directing moiety, to give up a proton thus rendering the acidic functionality negatively charged. A basic functionality is capable of being treated with an acidic moiety, as the charge-directing moiety, to accept a proton thus rendering the basic functionality positively charged. The charge-directing moiety is a substance that controls the nature of the charge that is introduced into the polymer.

With the acidic functionality, FG may be selected from the group consisting of carboxylic acids, sulfonic acids, phosphonic acids, phenols, thiophenols and fluorocarboxylic acids. Any basic moiety may be employed as the charge-directing moiety provided that the basic moiety removes a hydrogen atom from the acidic functionality to create a negative charge. The basic moiety should not interfere with the functions of BG and SG, and so forth.

With the basic functionality, FG may be selected from the group consisting of primary amines, secondary amines, tertiary amines, pyridines, imidazolines and the like. Any acidic moiety may be employed as the charge-directing moiety for the basic functionality provided that the acidic moiety adds a hydrogen atom to the basic functionality to create a positive charge. The acidic moiety should not interfere with the functions of BG and SG, and so forth.

In some embodiments, the copolymer comprises three blocks wherein each block comprises repeating monomer units; such tri-block copolymer has the formula:

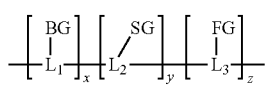　　　I wherein:

BG is independently selected from the group consisting of primary amines, secondary amines, tertiary amines, amides, nitriles, isonitriles, cyanates, isocyanates, thiocyanates, isothiocyanates, azides, thiols, thiolates, sulfides, sulfinates, sulfonates, phosphates, hydroxyls, alcoholates, phenolates, carbonyls, carboxylates, phosphines, phosphine oxides, phosphonic acids, phosphoramides and phosphates, $L_1$, $L_2$ and $L_3$ are each independently selected from the group consisting of:

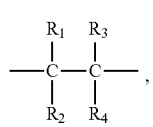　　　II

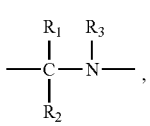　　　III

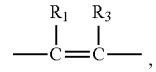　　　IV

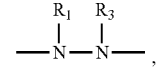　　　V wherein:

$R_1$, $R_2$, $R_3$, $R_4$ are each independently selected from the group consisting of hydrogen, alkyl, substituted alkyl, heteroalkyl (e.g., alkoxy, substituted alkoxy, thioalkyl, substituted thioalkyl), alkyl, substituted alkenyl, heteroalkenyl (e.g., alkenoxy, substituted alkenoxy, thioalkenyl, substituted thioalkenyl), alkynyl, substituted alkynyl, heteroalkynyl (e.g., alkynoxy, substituted alkynoxy, thioalkynyl, substituted thioalkynyl), aryl, substituted aryl, heteroaryl (e.g., aryloxy, substituted aryloxy, thioaryl, substituted thioaryl) and wherein at least one of $R_1$, $R_2$, $R_3$ and $R_4$ is BG, SG, or FG, and wherein in some embodiments, $R_1$ and $R_3$ in one or more of III, IV and V may be taken together to form a bond, x, y and z are integers independently between 1 and about 5,000, SG is selected from the group consisting of alkyl, substituted alkyl, alkoxy, substituted alkoxy, aryl and substituted aryl, and FG is either an acidic group selected from the group consisting of carboxylic acids, sulfonic acids, phosphonic acids, phenols, thiophenols and trifluorocarboxylic acids or a basic group selected from the group consisting of primary amines, secondary amines, tertiary amines, pyridines and imidazolines.

In some embodiments, the polymer comprises blocks of repeating units of monomer and has the formula:

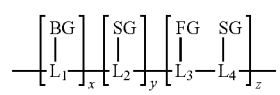　　　X wherein:

BG is a binding group that binds to the particle, $L_1$, $L_2$, $L_3$ and $L_4$ are each independently a portion of a polymer backbone, x, y and z are integers independently between 1 and about 5,000, SG is a hydrophobic moiety that provides steric stabilization and homogeneity of mixtures of the particle, and FG is a functional group that imparts a charge to the particle.

In some embodiments of the above polymer, $L_1$, $L_2$, $L_3$ and $L_4$ are each independently selected from the group consisting of:

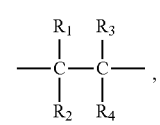　　　II

-continued

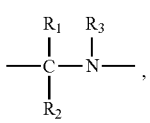
III

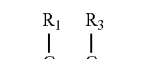
IV

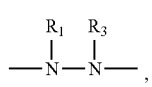
V wherein:

$R_1$, $R_2$, $R_3$, $R_4$ are each independently selected from the group consisting of hydrogen, alkyl, substituted alkyl, heteroalkyl (e.g., alkoxy, substituted alkoxy, thioalkyl, substituted thioalkyl), alkyl, substituted alkenyl, heteroalkenyl (e.g., alkenoxy, substituted alkenoxy, thioalkenyl, substituted thioalkenyl), alkynyl, substituted alkynyl, heteroalkynyl (e.g., alkynoxy, substituted alkynoxy, thioalkynyl, substituted thioalkynyl), aryl, substituted aryl, heteroaryl (e.g., aryloxy, substituted aryloxy, thioaryl, substituted thioaryl), and at least one of $R_1$, $R_2$, $R_3$ and $R_4$ is BG, SG, or FG for each of $L_1$, $L_2$, $L_3$ and $L_4$, and wherein in some embodiments, $R_1$ and $R_3$ in one or more of III, IV and V may be taken together to form a bond.

In some embodiments, the above polymer is a tri-block polymer wherein each block comprises repeating monomeric units selected from the group consisting of:

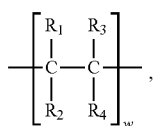
VI

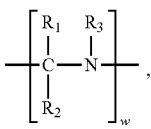
VII

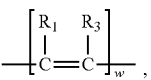
VIII

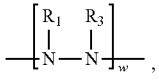
IX wherein:

$R_1$, $R_2$, $R_3$, $R_4$ are each independently selected from the group consisting of hydrogen, alkyl, substituted alkyl, heteroalkyl (e.g., alkoxy, substituted alkoxy, thioalkyl, substituted thioalkyl), alkyl, substituted alkenyl, heteroalkenyl (e.g., alkenoxy, substituted alkenoxy, thioalkenyl, substituted thioalkenyl), alkynyl, substituted alkynyl, heteroalkynyl (e.g., alkynoxy, substituted alkynoxy, thioalkynyl, substituted thioalkynyl), aryl, substituted aryl, heteroaryl (e.g., aryloxy, substituted aryloxy, thioaryl, substituted thioaryl), and at least one of $R_1$, $R_2$, $R_3$ and $R_4$ is BG, SG, or FG for each of $L_1$, $L_2$, $L_3$ and $L_4$, and wherein in some embodiments, $R_1$ and $R_3$ in one or more of III, IV and V may be taken together to form a bond, and w is x, y or z and is the same or different for each of $L_1$, $L_2$, $L_3$ and $L_4$.

In some embodiments, the polymer comprises monomer units having the formula:

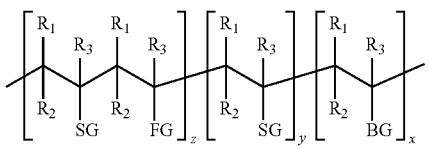
XI wherein:

BG is a binding group that binds to a particle, x, y and z are integers independently between 1 and about 5,000, SG is a hydrophobic moiety that provides steric stabilization and homogeneity of mixtures of the particle, FG is a functional group that imparts a charge to the particle, and $R_1$, $R_2$, $R_3$ are each independently selected from the group consisting of hydrogen, alkyl, substituted alkyl, heteroalkyl (e.g., alkoxy, substituted alkoxy, thioalkyl, substituted thioalkyl), alkyl, substituted alkenyl, heteroalkenyl (e.g., alkenoxy, substituted alkenoxy, thioalkenyl, substituted thioalkenyl), alkynyl, substituted alkynyl, heteroalkynyl (e.g., alkynoxy, substituted alkynoxy, thioalkynyl, substituted thioalkynyl), aryl, substituted aryl, heteroaryl (e.g., aryloxy, substituted aryloxy, thioaryl, substituted thioaryl).

In some embodiments, the polymer comprises block monomer units having the formula:

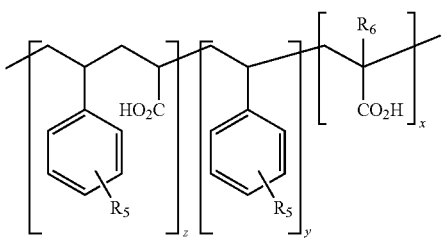
XII wherein:

$R_5$ are each independently selected from the group consisting of hydrogen, alkyl, substituted alkyl, heteroalkyl (e.g., alkoxy, substituted alkoxy, thioalkyl, substituted thioalkyl), alkyl, substituted alkenyl, heteroalkenyl (e.g., alkenoxy, substituted alkenoxy, thioalkenyl, substituted thioalkenyl), alkynyl, substituted alkynyl, heteroalkynyl (e.g., alkynoxy, substituted alkynoxy, thioalkynyl, substituted thioalkynyl), aryl, substituted aryl, heteroaryl (e.g., aryloxy, substituted aryloxy, thioaryl, substituted thioaryl), wherein in some embodiments, $R_5$ is para to the point of attachment of the phenyl group to the polymer backbone, and wherein in some embodiments, more than one $R_5$ may be present on the phenyl ring, and $R_6$ is hydrogen or alkyl, wherein the alkyl is branched or unbranched or a combination thereof, having 1 to 20 carbon atoms, or 1 to 15 carbon atoms, or 1 to 10 carbon atoms, or 1 to 9 carbon atoms, or 1 to 8 carbon atoms, or 1 to 7 carbon atoms, or 1 to 6 carbon atoms, or 1 to 5 carbon atoms, or 1 to 4 carbon atoms, or 1 to 3 carbon atoms, or 1 to 2 carbon atoms. In some embodiments, $R_6$ is methyl.

In some embodiments, the polymer comprises block monomer units having the above formula, wherein $R_5$ is para to the point of attachment of the phenyl group to the polymer backbone, and wherein there is only one $R_5$ on the respective phenyl group. This embodiment is represented by the formula:

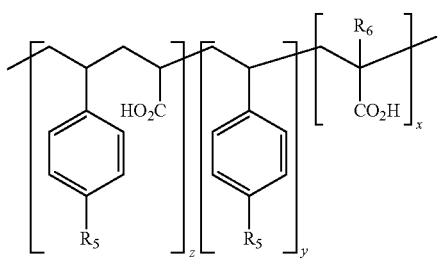

XIIA

The polymers in accordance with the present embodiments may be synthesized according to standard polymer chemistry using appropriate monomeric units. In some embodiments, each block of the tri-block polymer is prepared separately by polymerizing the starting monomeric unit. Then, the blocks are assembled into the tri-block polymer by a "living polymerization method." In the living polymerization method, the blocks are assembled stepwise. For a three-block copolymer, the first block is fabricated to have a reactive ending group to which the second block monomer is added to make a two-block polymer having a reactive ending group. The third block monomer is added to the two-block polymer to make a three-block polymer and so forth. In some embodiments, the number of monomers in each of the portions is controlled during the preparation of the block copolymer by controlling the molar concentration of the monomer units that are employed in the preparation of the blocks of the copolymer. Thus, the number of the binding groups, the number of stability enhancing and homogeneity enhancing groups and the number of the charge-imparting groups is controlled in the final block copolymer. The block copolymer may be tailored to the particular nanoparticle, its composition and its use.

Polymerization techniques include, for example, condensation (step reaction) polymerization, addition (chain reaction) polymerization (anionic, etc.), coordination polymerization, emulsion polymerization, ring opening polymerization, solution polymerization, step-growth polymerization, plasma polymerization, Ziegler process, radical polymerization, plasma polymerization, atom transfer radical polymerization, reversible addition fragmentation and chain transfer polymerization, nitroxide mediated polymerization, and so forth. The conditions for the polymerization, such as temperature, reaction medium, pH, duration, the order of addition of the reagents and the like, are dependent on the type of polymerization employed, the nature of the monomer reagents including any functional group employed, the nature of any catalyst employed, and so forth. Such conditions are generally known since the types of polymerization techniques that can be used are known in the art.

In an example by way of illustration and not limitation, the polymer XII is formed from the following block units:

Block Unit A:

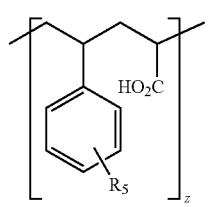

XIIa which is prepared by polymerizing the following monomer units using atom transfer polymerization, which employs an initiator such as, for example, methyl 2-bromopropionate, in an initiated condensation polymerization, wherein $R_5$ is as defined above and $R_7$ is a protecting group such as, for example, t-butyl:

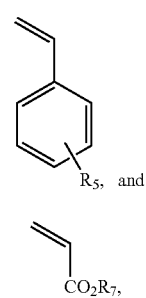

XIaa

XIIab

Block Unit B:

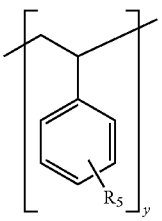

XIIb which is prepared by polymerizing the following monomer using atom transfer polymerization, which employs an initiator such as, for example, methyl 2-bromopropionate, in an initiated condensation polymerization:

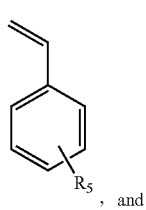

XIIba

, and

Block Unit C:

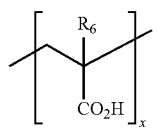
XIIc which is prepared by polymerizing the following monomer using atom transfer polymerization, which employs an initiator such as, for example, methyl 2-bromopropionate, in an initiated condensation polymerization:

XIIca

Block Units A, B and C (XIIa, XIIb and XIIc) from above are then assembled to form the tri-block polymer by living polymerization. The protecting group is removed subsequent to the polymerization reactions. The manner of removal of the protecting group depends on the nature of the protecting group and the like, and may be carried out employing known techniques such as ester hydrolysis and the like.

Specific Embodiments of Polymer-Nanoparticle Compositions

The polymers above are employed to prepare polymer-nanoparticle compositions that comprise a nanoparticle and a polymer. In various embodiments, the nanoparticles are particles that have cross-sectional dimensions in a range from about 1 nanometer (nm) to about 500 nm, or from about 1 nm to about 400 nm, or from about 1 nm to about 300 nm, or from about 1 nm to about 200 nm, or from about 1 nm to about 100 nm, or from about 1 nm to about 50 nm, or from about 5 nm to about 500 nm, or from about 5 nm to about 400 nm, or from about 5 nm to about 300 nm, or from about 5 nm to about 200 nm, or from about 5 nm to about 100 nm, or from about 5 nm to about 50 nm, or from about 10 nm to about 500 nm, or from about 10 nm to about 400 nm, or from about 10 nm to about 300 nm, or from about 10 nm to about 200 nm, or from about 10 nm to about 100 nm, or from about 10 nm to about 50 nm.

In some embodiments, each nanoparticle comprises a substantially pure element. In some embodiments, each nanoparticle comprises a binary, tertiary or quaternary compound. In some embodiments, the nanoparticle comprises an element selected from the group of elements (based on the periodic table of the elements) consisting of Group 2 (IIA) elements, Group 12 (IIB) elements, Group 13 (IIIA) elements, Group 4 (IVB) elements, Group 5 (VB) elements and Group 6 (VIB) elements, and combinations thereof, and oxides and sulfides thereof In some embodiments, the nanoparticle is an oxide or sulfide of an element selected from the group consisting of Group 2 (IIA) elements, Group 12 (IIB) elements, Group 13 (IIIA) elements, Group 4 (IVB) elements, Group 5 (VB) elements and Group 6 (VIB) elements. In some embodiments, the nanoparticle is an oxide or sulfide of a metallic material such as, for example, gold, silver, platinum, copper, iridium, palladium, iron, nickel, cobalt, titanium, hathium, zirconium, zinc, and the like, and alloys thereof. In some embodiments, the nanoparticle is a Group 4 (IVB) metal oxide such as, for example, $TiO_2$, $ZrO_2$, $HfO_2$, and the like; or a Group 8-10 (VIII) metal oxide, $Fe_2O_3$, CoO, NiO, and the like. In some embodiments, the nanoparticle does not comprise a semiconductive material. However, in some embodiments such as, for example, electrophoretic plasmonic displays discussed below, semiconductive nanoparticles may be employed as high refractive index particles. Such particles include high refractive index particles that are combinations of elements from Group 14 (IVA) and Group 16 (VIA) such as, for example, PbSe, PbS, and the like.

In some embodiments, a polymer-nanoparticle composition has the formula:

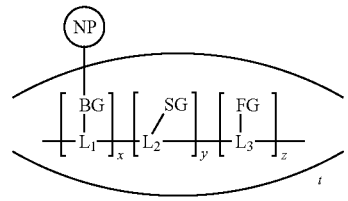
XIII wherein:
BG is a binding group that is bound to the nanoparticle,
$L_1$, $L_2$ and $L_3$ are each independently a portion of a polymer backbone,
x, y and z are integers independently between 1 and about 5,000,
t is an integer between 2 and about 50,
SG is a hydrophobic moiety that provides steric stabilization and homogeneity of mixtures of the nanoparticle,
FG is a functional group that is chargeable and imparts a charge to the nanoparticle, and
NP is a nanoparticle.

The number of polymer units bound to the nanoparticle by means of BG depends on the nature of the nanoparticle including the number of oxygen or sulfur atoms, the size of the nanoparticle, the nature of BG, and the like. In some embodiments, the number of polymer units (t) bound to the nanoparticle is about 2 to about 50, or about 2 to about 40, or about 2 to about 30, or about 2 to about 20, or about 2 to about 10, or about 2 to about 5, or about 2 to about 4, or about 2 to about 3, or about 3 to about 50, or about 3 to about 40, or about 3 to about 30, or about 3 to about 20, or about 3 to about 10, or about 3 to about 5, or about 3 to about 4, about 4 to about 50, or about 4 to about 40, or about 4 to about 30, or about 4 to about 20, or about 4 to about 10, or about 4 to about 5, about 5 to about 50, or about 5 to about 40, or about 5 to about 30, or about 5 to about 20, or about 5 to about 10, or about 5 to about 9, or about 5 to about 8, or about 5 to about 7, and so forth.

In the above embodiment, wherein t is 4, the polymer-nanoparticle composition has the formula:

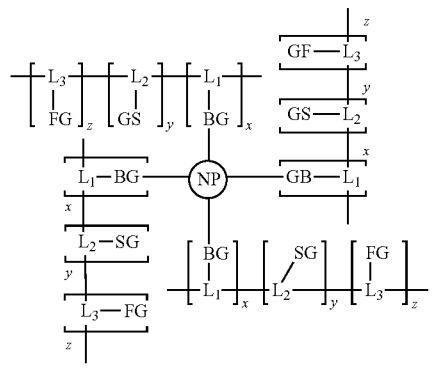
XIV wherein:
BG is a binding group that is bound to the nanoparticle,
$L_1$, $L_2$ and $L_3$ are each independently a portion of a polymer backbone,
x, y and z are integers independently between 1 and about 5,000,
SG is a hydrophobic moiety that provides steric stabilization and homogeneity of mixtures of the nanoparticle,
FG is a functional group that is chargeable and imparts a charge to the nanoparticle, and
NP is a nanoparticle.
In some embodiments, a polymer-nanoparticle composition has the formula:

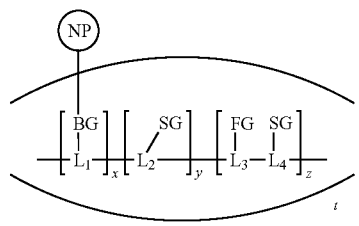

XV wherein:
BG is a binding group that is bound to the nanoparticle,
$L_1$, $L_2$, $L_3$ and $L_4$ are each independently a portion of a polymer backbone,
x, y and z are integers independently between 1 and about 5,000,
t is an integer between 2 and about 50,
SG is a hydrophobic moiety that provides steric stabilization and homogeneity of mixtures of the nanoparticle,
FG is a functional group that is chargeable and imparts a charge to the nanoparticle, and
NP is a nanoparticle.
In some embodiments, the polymer-nanoparticle composition has the formula:

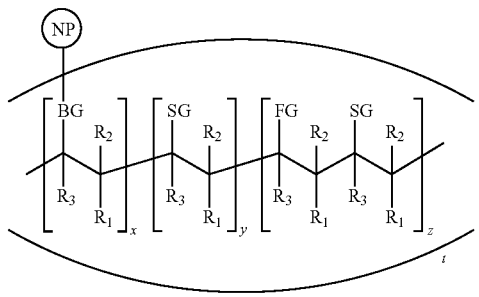

XVI wherein:
BG is a binding group that is bound to the nanoparticle,
$R_1$, $R_2$ and $R_3$ are each independently selected from the group consisting of hydrogen, alkyl, substituted alkyl, heteroalkyl (e.g., alkoxy, substituted alkoxy, thioalkyl, substituted thioalkyl), alkyl, substituted alkenyl, heteroalkenyl (e.g., alkenoxy, substituted alkenoxy, thioalkenyl, substituted thioalkenyl), alkynyl, substituted alkynyl, heteroalkynyl (e.g., alkynoxy, substituted alkynoxy, thioalkynyl, substituted thioalkynyl), aryl, substituted aryl, heteroaryl (e.g., aryloxy, substituted aryloxy, thioaryl, substituted thioaryl),
x, y and z are integers independently between 1 and about 5,000,
t is an integer between 2 and about 50,
SG is a hydrophobic moiety that provides steric stabilization and homogeneity of mixtures of the nanoparticle,
FG is a functional group that is chargeable and imparts a charge to the nanoparticle, and
NP is a nanoparticle.
In some embodiments, wherein t is 4, the polymer-nanoparticle composition has the formula:

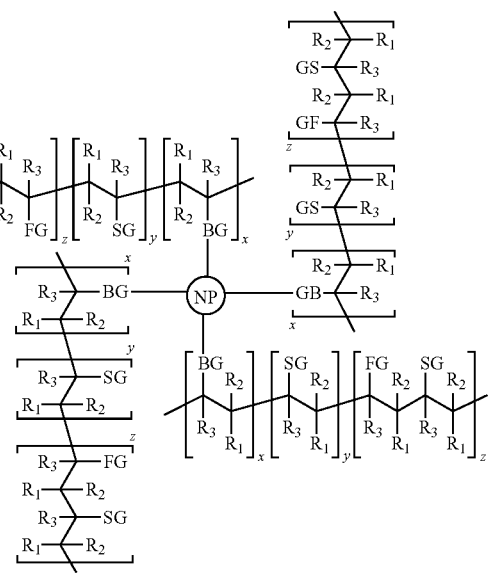

XVII wherein:
BG is a binding group that is bound to the nanoparticle,
$R_1$, $R_2$ and $R_3$ are each independently selected from the group consisting of hydrogen, alkyl, substituted alkyl, heteroalkyl (e.g., alkoxy, substituted alkoxy, thioalkyl, substituted thioalkyl), alkyl, substituted alkenyl, heteroalkenyl (e.g., alkenoxy, substituted alkenoxy, thioalkenyl, substituted thioalkenyl), alkynyl, substituted alkynyl, heteroalkynyl (e.g., alkynoxy, substituted alkynoxy, thioalkynyl, substituted thioalkynyl), aryl, substituted aryl, heteroaryl (e.g., aryloxy, substituted aryloxy, thioaryl, substituted thioaryl),
x, y and z are integers independently between 1 and about 5,000,
SG is a hydrophobic moiety that provides steric stabilization and homogeneity of mixtures of the nanoparticle,
FG is a functional group that is chargeable and imparts a charge to the nanoparticle, and
NP is a nanoparticle.

In some embodiments, the polymer-nanoparticle composition has the formula:

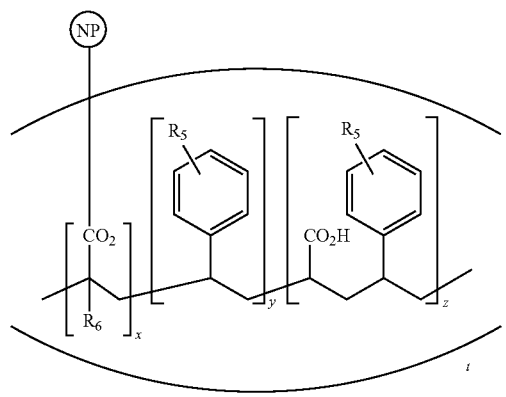

XVIII wherein:
R$_5$ are each independently selected from the group consisting of hydrogen, alkyl, substituted alkyl, heteroalkyl (e.g., alkoxy, substituted alkoxy, thioalkyl, substituted thioalkyl), alkyl, substituted alkenyl, heteroalkenyl (e.g., alkenoxy, substituted alkenoxy, thioalkenyl, substituted thioalkenyl), alkynyl, substituted alkynyl, heteroalkynyl (e.g., alkynoxy, substituted alkynoxy, thioalkynyl, substituted thioalkynyl), aryl, substituted aryl, heteroaryl (e.g., aryloxy, substituted aryloxy, thioaryl, substituted thioaryl), and wherein in some embodiments, more than one R$_5$ may be present on the respective phenyl ring, x, y and z are integers independently between 1 and about 5,000, t is an integer between about 2 and about 50, R$_6$ is lower alkyl; in some embodiments R$_6$ is methyl, and NP is a nanoparticle; in some embodiments NP comprises $TiO_2$, $ZrO_2$ or $HfO_2$.

In some embodiments, wherein t is 4 and there is only one R$_5$ on the respective phenyl ring, which is in a position on the phenyl ring that is para to the point of attachment of the phenyl to the polymer backbone, the polymer-nanoparticle composition has the formula:

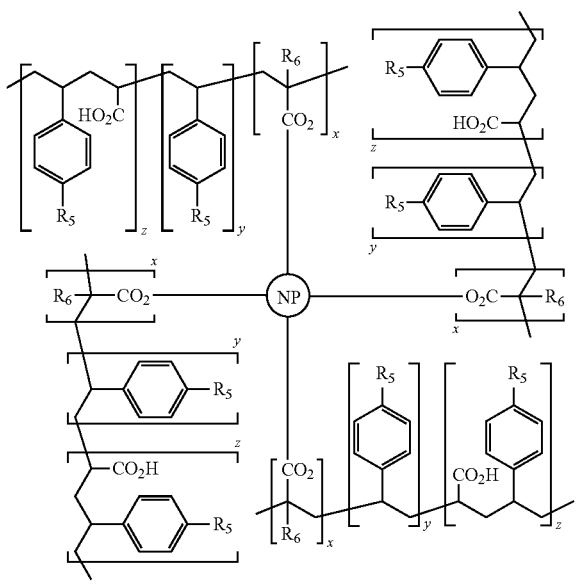

XIX wherein:
R$_5$ are each independently selected from the group consisting of hydrogen, alkyl, substituted alkyl, heteroalkyl (e.g., alkoxy, substituted alkoxy, thioalkyl, substituted thioalkyl), alkyl, substituted alkenyl, heteroalkenyl (e.g., alkenoxy, substituted alkenoxy, thioalkenyl, substituted thioalkenyl), alkynyl, substituted alkynyl, heteroalkynyl (e.g., alkynoxy, substituted alkynoxy, thioalkynyl, substituted thioalkynyl), aryl, substituted aryl, heteroaryl (e.g., aryloxy, substituted aryloxy, thioaryl, substituted thioaryl), x, y and z are integers independently between 1 and about 5,000, R$_6$ is lower alkyl; in some embodiments R$_6$ is methyl, and NP is a nanoparticle; in some embodiments NP comprises $TiO_2$, $ZrO_2$ or $HfO_2$.

As mentioned above, the polymer may be reacted with a nanoparticle so that BG binds to the nanoparticle. Various functionalities are set forth above for BG and the particle. In some embodiments, the polymer reaction with the nanoparticle involves ligand exchange. An example of such an approach is shown in FIG. 1 by way of illustration and not limitation. Referring to FIG. 1, tri-block copolymer XV is mixed with nanoparticles in a non-polar solvent. The nanoparticles may be $TiO_2$, $ZrO_2$ or $HfO_2$, and wherein t=4. A ligand exchange reaction takes place to achieve a polymer-nanoparticle composition XX that is stable and highly dispersible in the non-polar medium. The reaction of XX with a charge control agent such as an acid or a base, depending on the nature of FG, results in the introduction of a charge on FG (FG$^-$) and the production of a charged, stable and dispersible polymer-nanoparticle composition XXI.

Figure 2:
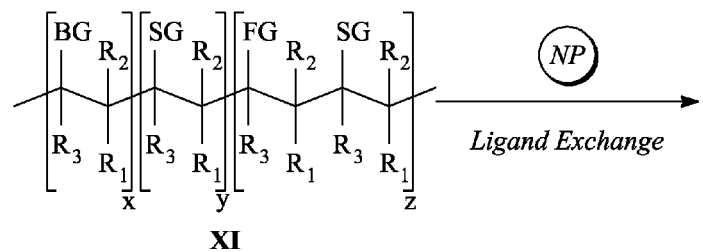
FIG. 2 is a scheme depicting a method of making a charged functionalized tri-block copolymer-nanoparticle compositions in accordance with another embodiment of the present invention.
Figure 2:
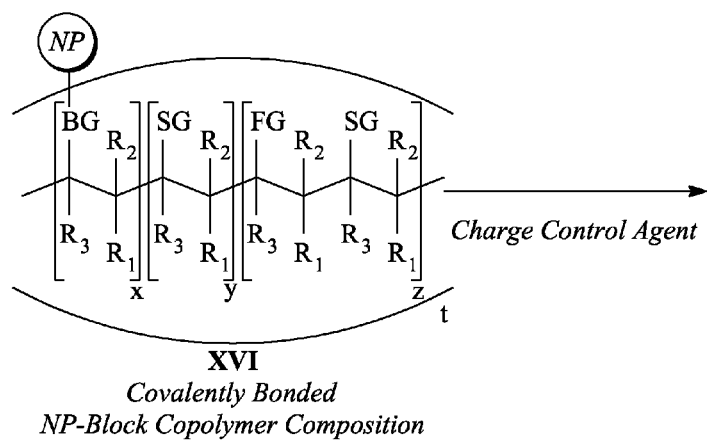
Figure 2:
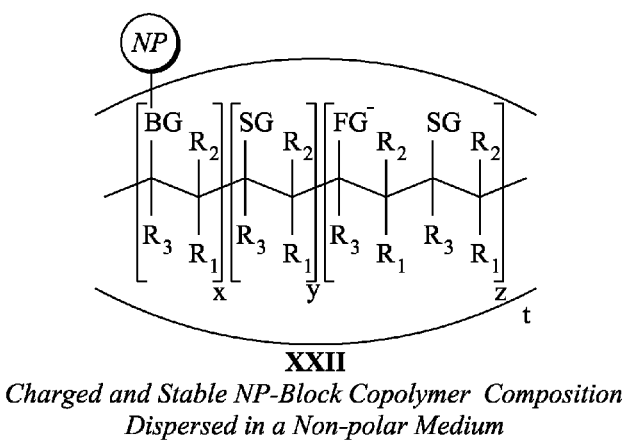

Another embodiment of the reaction of a polymer with a nanoparticle resulting in the binding of BG to the nanoparticle is shown in FIG. 2 by way of illustration and not limitation. Referring to FIG. 2, tri-block copolymer XI is mixed with nanoparticles in a non-polar solvent. The nanoparticles may be $TiO_2$, $ZrO_2$ or $HfO_2$, and wherein t=4. A ligand exchange reaction takes place to achieve polymer-nanoparticle composition XVI that is stable and highly dispersible in the non-polar medium. The reaction of XVI with a charge control agent such as an acid or a base, depending on the nature of FG, results in the introduction of a charge on FG (FG$^-$) and the production of a charged, stable and dispersed polymer-nanoparticle composition XXII.

Figure 3:
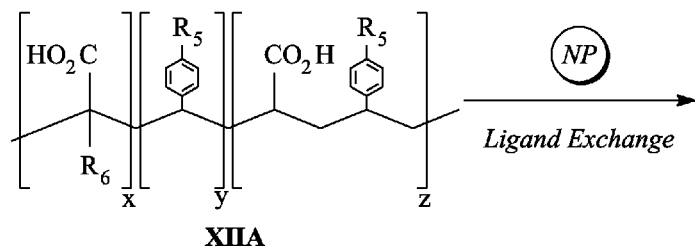
FIG. 3 is a scheme depicting a method of making a charged functionalized tri-block copolymer-nanoparticle compositions in accordance with another embodiment of the present invention.
Figure 3:
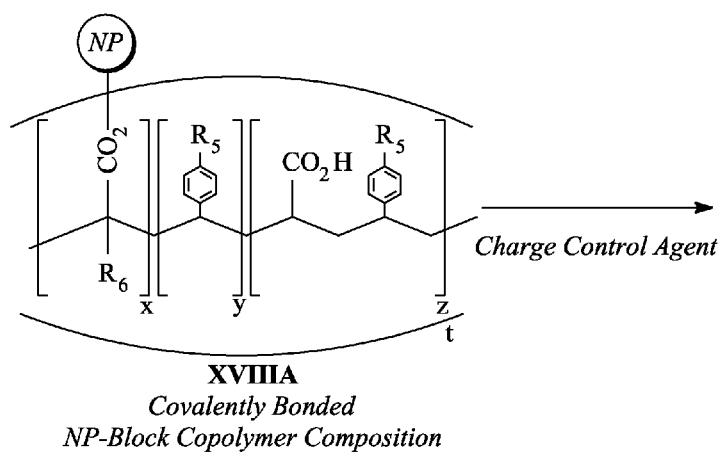
Figure 3:
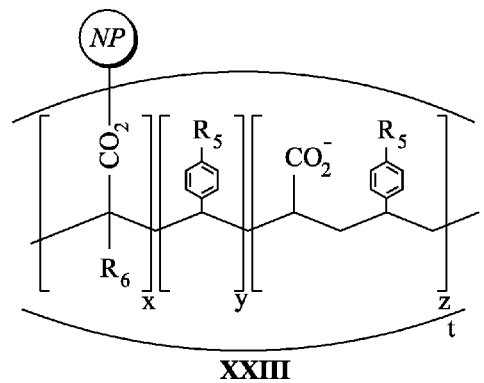

Another embodiment of the reaction of a polymer with a nanoparticle so that BG binds to the nanoparticle is shown in FIG. 3 by way of illustration and not limitation. Referring to FIG. 3, tri-block copolymer XIIA, wherein R$_5$ is in a position that is para to the point of attachment of the phenyl ring to the polymer backbone, is mixed with nanoparticles in a non-polar solvent. The nanoparticles may be $TiO_2$, $ZrO_2$ or $HfO_2$, and wherein t=4. In this embodiment, BG on copolymer XIIA is a carboxylic acid function. A ligand exchange reaction takes place to achieve a polymer-nanoparticle composition XVIIIA that is stable and highly dispersible in the non-polar medium. The reaction of XVIIIA with a charge control agent, which in this embodiment is a base since FG is a carboxylic acid function, results in the removal of a hydrogen ion from the carboxylic acid function to give a carboxylate anion. Thus, a charged, stable and dispersed polymer-nanoparticle composition XXIII is prepared in a non-polar medium.

As discussed above, in some embodiments of the preparation of the polymer-nanoparticle compositions, a ligand exchange reaction is employed. The reaction is usually carried out in a non-polar medium, which may be the same medium as that employed for using the polymer-nanoparticle compositions in various devices, as discussed more fully below. The reaction is conducted by mixing the polymer and the nanoparticle in the non-polar medium. Generally, the temperature employed during the procedure will be chosen to maximize the binding of the polymer to the nanoparticle, and so forth. The temperature employed depends on the nature of the BG group on the polymer, the nature of the polymer, the nature of the nanoparticle, the nature of the ligand associated with the particle, the nature of the non-polar medium, and the like. The temperature for the procedure is generally in a range of from about 0° C. to about 100° C., or from about 10° C. to about 100° C., or from about 20° C. to about 100° C., or from about 25° C. to about 100° C., or from about 20° C. to about 90° C., or from about 20° C. to about 80° C., or from about 20° C. to about 70° C., or from about 20° C. to about 60° C., or from about 20° C. to about 50° C., or from about 20° C. to about 40° C., or from about 20° C. to about 30° C., and so forth. In some embodiments, the reaction is carried out at ambient temperature. The pH for the medium will usually be in the range of about 3 to about 11, or in the range of about 5 to about 9, or in the range of about 6 to about 8.

Specific Embodiments of the use of Polymer-Nanoparticle Compositions

The polymer-nanoparticle compositions may be employed in a variety of applications that involve the motion of charged particles through a liquid medium as a result of an applied electric field. Such applications include, for example, displays including electrophoretic displays, electric field-addressable dielectric media for plasmon-based displays, and the like. Use of embodiments of the present copolymer-nanoparticle compositions in displays results in highly stable, charged homogeneous nanoparticle dispersions in environmentally friendly, non-polar media.

One type of electrophoretic display involves particles that have a high refractive index when compared to a surrounding liquid medium in which the particles are dispersed. In this type of electrophoretic display, optical scattering arises from the refractive index contrast between the particles and surrounding liquid medium, which is usually a non-polar medium such as, for example, a hydrocarbon (e.g., $C_1$-$C_{20}$ alkanes and cycloalkanes, including substituted alkanes and substituted cycloalkanes), for example, hexane, cyclohexane, dodecane, isoparafinnic fluids such as, e.g., ISOPAR™ L fluid, ISOPAR™ M fluid, ISOPAR™ V fluid, etc., and the like), a siloxane or a substituted siloxane (both low and high molecular weight), and so forth. ISOPAR is a registered trademark of ExxonMobil Corp., Tex. The aforementioned type of electrophoretic display differs from the type of electrophoretic display that is an information display wherein visible images are formed by rearranging charged pigment particles using an applied electric field.

Some metal oxides and sulfides are suited for electrophoretic displays that rely on optical scattering by high refractive index particles. The metals of the metal oxides are generally from Group 2 (IIA), Group 12 (IIB), Group 13 (IIIA), Group 4 (IVB), Group 5 (VB) and Group 6 (VIB) of the periodic table. Of particular interest for electrophoretic displays are oxides of metals of Group 4 (IVB) such as $TiO_2$, $ZrO_2$ and $HfO_2$. Such metal oxides, e.g. $TiO_2$, are suited for this type of electrophoretic display because such metal oxides possess good chemical and thermal stability as well as a high refractive index that can produce a bright white color. Titanium dioxide particles are typically inorganic ultrafine particles. In an electrophoretic display involving high refractive index particles, millions of $TiO_2$ particles, each about a micrometer (a thousandth of a millimeter) or less in diameter, are suspended in a liquid medium comprising one or more hydrocarbons and a black dye. The $TiO_2$ particles are covered with charging agents to give them an electric charge.

Although the modification of the surface of such metal oxide particles, e.g., $TiO_2$ particles, by either chemical or physical methods such as adsorption, inorganic coating and the like has been reported, the stability and charge of dispersions of the resulting modified particles are inadequate for some applications particularly where the application requires small particles such as nanoparticles. In addition, some of the modified metal oxide surfaces require toxic solvents such as, e.g., tetrachloroethylene (PCE), as a dispersing medium. The present copolymer-nanoparticle compositions provide highly stable, charged homogeneous nanoparticle dispersions in non-polar media for use in electrophoretic displays that utilize high refractive index particles.

In the above type of electrophoretic display, metal oxide particles are dispersed or suspended in a hydrocarbon oil between two parallel conductive plates about 10 to about 100 micrometers apart. A dark-colored dye is also added to the oil, along with surfactants and charging agents that cause the particles to take on an electric charge. The parallel conductive plates are connected to circuitry that allows external signals to manipulate the electric charge at different precise points on the display. By manipulating the charge, the particles either migrate to the surface of the display or rest near the back. This effect is called electrophoresis, after which the display is named. While at the surface, the metal oxide particles scatter light, thus appearing bright white. While near the back, the dye solution makes the pixel seem black. By manipulating charge over the entire display, an image can be created. Using color filters allows the display of the full visible spectrum. If the rear electrode is divided into a number of small picture elements or pixels, then an image can be formed by applying the appropriate voltage to each region of the display to create a pattern of reflecting and absorbing regions.

There are a number of drive electronics for electrophoretic displays. In one approach, two electrodes are overlapped with a gap between them. The gap contains electrophoretic particles and a liquid medium. Each pixel is defined by an overlap of electrodes. In this approach, each pixel is directly tied to the display controller and each pixel is updated directly by the controller's application of voltage. Each line in this type of display is addressed individually. In another approach, rather than addressing single pixels, thin film transistors at each pixel act as nonlinear elements, allowing row-by-row addressing. The row electrode acts as the switch to allow the row to be either in conduction or not (i.e. 'on' or 'off'), while the data lines provide the voltage necessary to make the image. Other approaches involve means of building a charge locally to move charged particles through the liquid medium. These latter drive types include external addressing using electrostatic addressing, ion projection, and photoconductor addressing.

In one device in accordance with the present embodiments, the device comprises at least two conductive plates wherein the conductive plates are separately activatable by one or more voltage sources. A copolymer-nanoparticle composition, in accordance with the present embodiments, in a non-polar medium is disposed between the conductive plates wherein the copolymer-nanoparticle composition comprises nanoparticles each having bound thereto one or more copolymers. The copolymer comprises first, second and third block units. The first block unit comprises repeating units of a monomer comprising a binding group that is bound to the nanoparticle. The second block unit comprises repeating units of a monomer comprising a hydrophobic moiety that provides steric stabilization of the particle and homogeneity of mixtures of the polymer in a non-polar medium. The third block unit comprises repeating units of a monomer comprising a chargeable group that imparts a charge to the nanoparticle. The order of the respective block units in the copolymer and the number of repeating units of the monomer in the respective block units control the stability, the homogeneity of mixtures and the charge of the nanoparticle in the non-polar medium.

Figure 4:
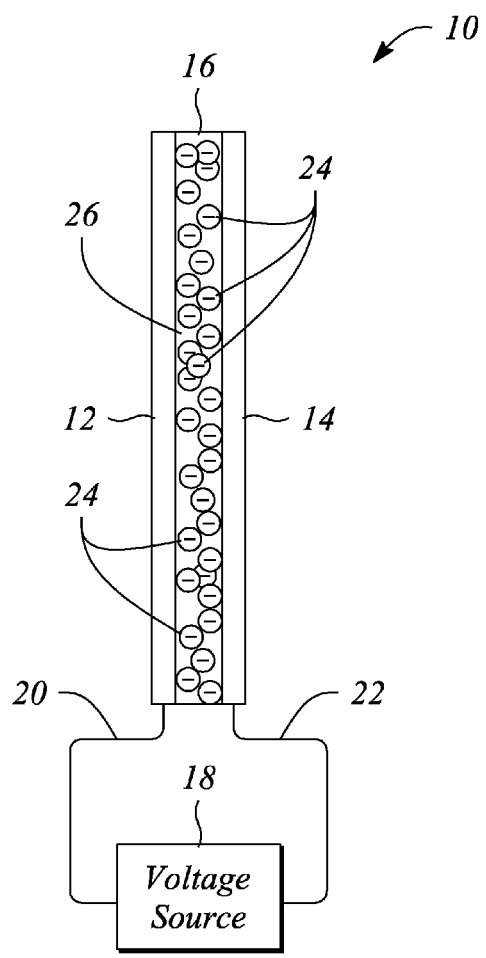
FIG. 4 is a schematic diagram of an electrophoretic display device employing a polymer-nanoparticle composition in accordance with an embodiment of the present invention.

An embodiment of a device utilizing a copolymer-nanoparticle composition of the present embodiments is depicted in FIG. 4 by way of illustration and not limitation. Device 10 comprises two conductive plates 12 and 14 having sealed gap 16 disposed between plate 12 and plate 14. Each of plate 12 and plate 14 is respectively connected to voltage source 18 by means of lines 20 and 22. Voltage source 18 is designed to separately activate plate 12 and plate 14. A polymer-nanoparticle composition, in accordance with the present embodiments, comprising nanoparticles 24 in a non-polar medium 26 is disposed in gap 16. In use, plates 12 and 14 are separately activated to create the desired display.

The present copolymer-nanoparticle compositions also find use in reflective displays based on tunable plasmon resonances in nanoscale structures as described in U.S. patent application Ser. No. 11/888,356, filed 31 Jul. 2007. This type of display relies on the fact that plasmon resonances can strongly absorb or scatter light. The wavelengths that are absorbed or scattered depend on the dielectric properties of the medium surrounding the plasmonic structures. In one embodiment, the dielectric properties in the neighborhood of the plasmonic structures are controlled by electrophoretically moving high refractive index particles in a fluid toward or away from these structures, thereby tuning their apparent color.

Definitions:

The following provides definitions for terms and phrases used above, which were not previously defined.

The phrase "at least" as used herein means that the number of specified items may be equal to or greater than the number recited. The phrase "about" as used herein means that the number recited may differ by plus or minus 10%; for example, "about 5" means a range of 4.5 to 5.5. The term "between" when used in conjunction with two numbers such as, for example, "between about 2 and about 50" includes both of the numbers recited. Thus, the phrase "an integer between about 2 and about 100" means that the integer may be about 2 or about 100 or any integer between 2 and 100.

The term "substituted" means that a hydrogen atom of a compound or moiety is replaced by another atom such as a carbon atom or a heteroatom, which is part of a group referred to as a substituent. Substituents include, for example, alkyl, alkoxy, aryl, aryloxy, alkenyl, alkenoxy, alkynyl, alkynoxy, thioalkyl, thioalkenyl, thioalkynyl, thioaryl, and the like.

The term "heteroatom" as used herein means nitrogen, oxygen, phosphorus or sulfur. The terms "halo" and "halogen" mean a fluoro, chloro, bromo, or iodo substituent. The term "cyclic" means having an alicyclic or aromatic ring structure, which may or may not be substituted, and may or may not include one or more heteroatoms. Cyclic structures include monocyclic structures, bicyclic structures, and polycyclic structures. The term "alicyclic" is used to refer to an aliphatic cyclic moiety, as opposed to an aromatic cyclic moiety.

The phrase "aromatic ring system" or "aromatic" as used herein includes monocyclic rings, bicyclic ring systems, and polycyclic ring systems, in which the monocyclic ring, or at least a portion of the bicyclic ring system or polycyclic ring system, is aromatic (exhibits, e.g., π-conjugation). The monocyclic rings, bicyclic ring systems, and polycyclic ring systems of the aromatic ring systems may include carbocyclic rings and/or heterocyclic rings. The term "carbocyclic ring" denotes a ring in which each ring atom is carbon. The term "heterocyclic ring" denotes a ring in which at least one ring atom is not carbon and comprises 1 to 4 heteroatoms.

The term "alkyl" as used herein means a branched, unbranched, or cyclic saturated hydrocarbon group, which typically, although not necessarily, contains from 1 to about 50 carbon atoms, or 1 to about 40 carbon atoms, or 1 to about 30 carbon atoms and so forth. Alkyls include, but are not limited to, methyl, ethyl, n-propyl, isopropyl, n-butyl, isobutyl, t-butyl, octyl, decyl, and the like, as well as cycloalkyl groups such as cyclopentyl, cyclohexyl and the like. The term "lower alkyl" means an alkyl group having from 1 to 6 carbon atoms. The term "higher alkyl" means an alkyl group having more than 6 carbon atoms, for example, 7 to about 50 carbon atoms, or 7 to about 40 carbon atoms, or 7 to about 30 carbon atoms or more. As used herein, the term "substituted alkyl" means an alkyl substituted with one or more substituent groups. The term "heteroalkyl" means an alkyl in which at least one carbon atom is replaced with a heteroatom. If not otherwise indicated, the term "alkyl" includes unsubstituted alkyl, substituted alkyl, lower alkyl, and heteroalkyl.

As used herein, the term "alkenyl" means a linear, branched or cyclic hydrocarbon group of 2 to about 50 carbon atoms, or 2 to about 40 carbon atoms, or 2 to about 30 carbon atoms or more containing at least one double bond, such as ethenyl, n-propenyl, isopropenyl, n-butenyl, isobutenyl, octenyl, decenyl, tetradecenyl, hexadecenyl, eicosenyl, tetracosenyl, and the like. The term "lower alkenyl" means an alkenyl having from 2 to 6 carbon atoms. The term "higher alkenyl" means an alkenyl group having more than 6 carbon atoms, for example, 7 to about 50 carbon atoms, or 7 to about 40 carbon atoms, or 7 to about 30 carbon atoms or more. The term "substituted alkenyl" means an alkenyl or cycloalkenyl substituted with one or more substituent groups. The term "heteroalkenyl" means an alkenyl or cycloalkenyl in which at least one carbon atom is replaced with a heteroatom. If not otherwise indicated, the term "alkenyl" includes unsubstituted alkenyl, substituted alkenyl, lower alkenyl, and heteroalkenyl.

As used herein, the term "alkynyl" means a linear, branched or cyclic hydrocarbon group of 2 to about 50 carbon atoms, or 2 to about 40 carbon atoms, or 2 to about 30 carbon atoms or more containing at least one triple bond, such as ethynyl, n-propynyl, isopropynyl, n-butynyl, isobutynyl, octynyl, decynyl, tetradecynyl, hexadecynyl, eicosynyl, tetracosynyl, and the like. The term "lower alkynyl" means an alkynyl having from 2 to 6 carbon atoms. The term "higher alkynyl" means an alkynyl group having more than 6 carbon atoms, for example, 7 to about 50 carbon atoms, or 7 to about 40 carbon atoms, or 7 to about 30 carbon atoms or more. The term "substituted alkynyl" means an alkynyl or cycloalkynyl substituted with one or more substituent groups. The term "heteroalkynyl" means an alkynyl or cycloalkynyl in which at least one carbon atom is replaced with a heteroatom. If not otherwise indicated, the term "alkynyl" includes unsubstituted alkynyl, substituted alkynyl, lower alkynyl, and heteroalkynyl.

The term "alkylene" as used herein means a linear, branched or cyclic alkyl group in which two hydrogen atoms are substituted at locations in the alkyl group, having 1 to about 50 carbon atoms, or 1 to about 40 carbon atoms, or 1 to about 30 carbon atoms. Alkylene linkages thus include —$CH_2CH_2$— and —$CH_2CH_2CH_2$—, and so forth, as well as substituted versions thereof wherein one or more hydrogen atoms are replaced with a non-hydrogen substituent. The term "lower alkylene" refers to an alkylene group containing from 2 to 6 carbon atoms. The term "higher alkylene" means an alkylene group having more than 6 carbon atoms, for example, 7 to about 50 carbon atoms, or 7 to about 40 carbon atoms, or 7 to about 30 carbon atoms or more. As used herein, the term "substituted alkylene" means an alkylene substituted with one or more substituent groups. As used herein, the term "heteroalkylene" means an alkylene wherein one or more of the methylene units are replaced with a heteroatom. If not otherwise indicated, the term "alkylene" includes heteroalkylene.

The term "alkenylene" as used herein means an alkylene containing at least one double bond, such as ethenylene (vinylene), n-propenylene, n-butenylene, n-hexenylene, and the like as well as substituted versions thereof wherein one or more hydrogen atoms are replaced with a non-hydrogen substituent, having 1 to about 50 carbon atoms, or 1 to about 40 carbon atoms, or 1 to about 30 carbon atoms. The term "lower alkenylene" refers to an alkenylene group containing from 2 to 6 carbon atoms. The term "higher alkenylene" means an alkenylene group having more than 6 carbon atoms, for example, 7 to about 50 carbon atoms, or 7 to about 40 carbon atoms, or 7 to about 30 carbon atoms or more. As used herein, the term "substituted alkenylene" means an alkenylene substituted with one or more substituent groups. As used herein, the term "heteroalkenylene" means an alkenylene wherein one or more of the alkenylene units are replaced with a heteroatom. If not otherwise indicated, the term "alkenylene" includes heteroalkenylene.

The term "alkynylene" as used herein means an alkylene containing at least one triple bond, such as ethynylene, n-propynylene, n-butynylene, n-hexynylene, and the like, having 1 to about 50 carbon atoms, or 1 to about 40 carbon atoms, or 1 to about 30 carbon atoms. The term "lower alkynylene" refers to an alkynylene group containing from 2 to 6 carbon atoms. The term "higher alkynylene" means an alkynylene group having more than 6 carbon atoms, for example, 7 to about 50 carbon atoms, or 7 to about 40 carbon atoms, or 7 to about 30 carbon atoms or more. As used herein, the term "substituted alkynylene" means an alkynylene substituted with one or more substituent groups. As used herein, the term "heteroalkynylene" means an alkynylene wherein one or more of the alkynylene units are replaced with a heteroatom. If not otherwise indicated, the term "alkynylene" includes heteroalkynylene.

The term "alkoxy" as used herein means an alkyl group bound to another chemical structure through a single, terminal ether linkage, having 1 to about 50 carbon atoms, or 1 to about 40 carbon atoms, or 1 to about 30 carbon atoms. As used herein, the term "lower alkoxy" means an alkoxy group, wherein the alkyl group contains from 1 to 6 carbon atoms, and includes, for example, methoxy, ethoxy, n-propoxy, isopropoxy, t-butyloxy, etc. The term "higher alkoxy" means an alkoxy group wherein the alkyl group has more than 6 carbon atoms, for example, 7 to about 50 carbon atoms, or 7 to about 40 carbon atoms, or 7 to about 30 carbon atoms or more. As used herein, the term "substituted alkoxy" means an alkoxy substituted with one or more substituent groups. The term "heteroalkoxy" means an alkoxy in which at least one carbon atom is replaced with a heteroatom. If not otherwise indicated, the term "alkoxy" includes unsubstituted alkoxy, substituted alkoxy, lower alkoxy, and heteroalkoxy.

The term "alkenoxy" as used herein means an alkenyl group bound to another chemical structure through a single, terminal ether linkage, having 1 to about 50 carbon atoms, or 1 to about 40 carbon atoms, or 1 to about 30 carbon atoms. As used herein, the term "lower alkenoxy" means an alkenoxy group, wherein the alkenyl group contains from 2 to 6 carbon atoms, and includes, for example, ethenoxy, n-propenoxy, isopropenoxy, t-butenoxy, etc. The term "higher alkenoxy" means an alkenoxy group wherein the alkenyl group has more than 6 carbon atoms, for example, 7 to about 50 carbon atoms, or 7 to about 40 carbon atoms, or 7 to about 30 carbon atoms or more. As used herein, the term "substituted alkenoxy" means an alkenoxy substituted with one or more substituent groups. The term "heteroalkenoxy" means an alkenoxy in which at least one carbon atom is replaced with a heteroatom. If not otherwise indicated, the term "alkenoxy" includes unsubstituted alkenoxy, substituted alkenoxy, lower alkenoxy, higher alkenoxy and heteroalkenoxy.

The term "alkynoxy" as used herein means an alkynyl group bound to another chemical structure through a single, terminal ether linkage, having 1 to about 50 carbon atoms, or 1 to about 40 carbon atoms, or 1 to about 30 carbon atoms. As used herein, the term "lower alkynoxy" means an alkynoxy group, wherein the alkynyl group contains from 2 to 6 carbon atoms, and includes, for example, ethynoxy, n-propynoxy, isopropynoxy, t-butynoxy, etc. The term "higher alkynoxy" means an alkynoxy group wherein the alkynyl group has more than 6 carbon atoms, for example, 7 to about 50 carbon atoms, or 7 to about 40 carbon atoms, or 7 to about 30 carbon atoms or more. As used herein, the term "substituted alkynoxy" means an alkynoxy substituted with one or more substituent groups. The term "heteroalkynoxy" means an alkynoxy in which at least one carbon atom is replaced with a heteroatom. If not otherwise indicated, the term "alkynoxy" includes unsubstituted alkynoxy, substituted alkynoxy, lower alkynoxy, higher alkynoxy and heteroalkynoxy.

The term "thioalkyl" as used herein means an alkyl group bound to another chemical structure through a single, terminal thio (sulfur) linkage, having 1 to about 50 carbon atoms, or 1 to about 40 carbon atoms, or 1 to about 30 carbon atoms. As used herein, the term "lower thioalkyl" means a thioalkyl group, wherein the alkyl group contains from 1 to 6 carbon atoms, and includes, for example, thiomethyl, thioethyl, thiopropyl, etc. The term "higher thioalkyl" means a thioalkyl group wherein the alkyl group has more than 6 carbon atoms, for example, 7 to about 50 carbon atoms, or 7 to about 40 carbon atoms, or 7 to about 30 carbon atoms or more. As used herein, the term "substituted thioalkyl" means a thioalkyl substituted with one or more substituent groups. The term "heterothioalkyl" means a thioalkyl in which at least one carbon atom is replaced with a heteroatom. If not otherwise indicated, the term "thioalkyl" includes unsubstituted thioalkyl, substituted thioalkyl, lower thioalkyl, and heterothioalkyl.

The term "thioalkenyl" as used herein means an alkenyl group bound to another chemical structure through a single, terminal thio (sulfur) linkage, having 1 to about 50 carbon atoms, or 1 to about 40 carbon atoms, or 1 to about 30 carbon atoms. As used herein, the term "lower thioalkenyl" means a thioalkenyl group, wherein the alkenyl group contains from 2 to 6 carbon atoms, and includes, for example, thioethenyl, thiopropenyl, etc. The term "higher thioalkenyl" means a thioalkenyl group wherein the alkenyl group has more than 6 carbon atoms, for example, 7 to about 50 carbon atoms, or 7 to about 40 carbon atoms, or 7 to about 30 carbon atoms or more. As used herein, the term "substituted thioalkenyl" means a thioalkenyl substituted with one or more substituent groups. The term "heterothioalkenyl" means a thioalkenyl in which at least one carbon atom is replaced with a heteroatom. If not otherwise indicated, the term "thioalkenyl" includes unsubstituted thioalkenyl, substituted thioalkenyl, lower thioalkenyl, and heterothioalkenyl.

The term "thioalkynyl" as used herein means an alkynyl group bound to another chemical structure through a single, terminal thio (sulfur) linkage, having 1 to about 50 carbon atoms, or 1 to about 40 carbon atoms, or 1 to about 30 carbon atoms. As used herein, the term "lower thioalkynyl" means a thioalkynyl group, wherein the alkyl group contains from 2 to 6 carbon atoms, and includes, for example, thioethynyl, thiopropylynyl, etc. The term "higher thioalkynyl" means a thioalkynyl group wherein the alkynyl group has more than 6 carbon atoms, for example, 7 to about 50 carbon atoms, or 7 to about 40 carbon atoms, or 7 to about 30 carbon atoms or more. As used herein, the term "substituted thioalkynyl" means a thioalkynyl substituted with one or more substituent groups. The term "heterothioalkynyl" means a thioalkynyl in which at least one carbon atom is replaced with a heteroatom. If not otherwise indicated, the term "thioalkynyl" includes unsubstituted thioalkynyl, substituted thioalkynyl, lower thioalkynyl, and heterothioalkynyl.

The term "aryl" means a group containing a single aromatic ring or multiple aromatic rings that are fused together, directly linked, or indirectly linked (such that the different aromatic rings are bound to a common group such as a methylene or ethylene moiety). Aryl groups described herein may contain, but are not limited to, from 5 to about 50 carbon atoms, or 5 to about 40 carbon atoms, or 5 to 30 carbon atoms or more. Aryl groups include, for example, phenyl, naphthyl, anthryl, phenanthryl, biphenyl, diphenylether, diphenylamine, benzophenone, and the like. The term "substituted aryl" refers to an aryl group comprising one or more substituent groups. The term "heteroaryl" means an aryl group in which at least one carbon atom is replaced with a heteroatom. If not otherwise indicated, the term "aryl" includes unsubstituted aryl, substituted aryl, and heteroaryl.

The term "aryloxy" as used herein means an aryl group bound to another chemical structure through a single, terminal ether (oxygen) linkage, having from 5 to about 50 carbon atoms, or 5 to about 40 carbon atoms, or 5 to 30 carbon atoms or more. The term "phenoxy" as used herein is aryloxy wherein aryl is phenyl.

The term "thioaryl" as used herein means an aryl group bound to another chemical structure through a single, terminal thio (sulfur) linkage, having from 5 to about 50 carbon atoms, or 5 to about 40 carbon atoms, or 5 to 30 carbon atoms or more. The term "thiophenyl" as used herein is thioaryl wherein aryl is phenyl.

EXAMPLES

Materials:

Unless otherwise indicated, materials in the experiments below were purchased from Aldrich Chemical Company, St. Louis, Mo.

Preparation of Block Acrylic Acid/Methacrylic Acid XXIV:

Copper(I) bromide (8.66 g) was saturated with nitrogen in a 500 ml flask. Acetone (120 ml) was added, followed by N,N,N',N',N'-pentamethyldiethylenetetramine (PMDETA) (13.3 ml). This mixture was stirred to obtain the copper complex. A mixture of t-butyl acrylate (90.6 g) and t-butyl methacrylate (109.4 g) was added. The reaction mixture was cooled to about 5° C. Then, the initiator methyl 2-bromopropionate (MBP) (37 ml) was added. The mixture was maintained at approximately 5° C. for another 1 h (h =hour) and allowed to obtain room temperature. The mixture was stirred at ambient temperature for 41 h followed by heating to 75° C. for 1 h. The mixture was cooled and acetone (80 g) was added to dilute the polymer solution. The mixture was filtered through a neutral alumina column to remove the copper complex completely. The solvent was removed under low pressure to obtain the block XXIV with a bromo end group. This molecule XXIV served as a macro-initiator and was used for incorporating other blocks. The reaction is carried out under nitrogen.

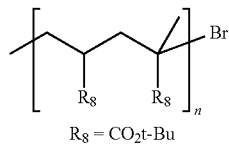

XXIV $R_8 = CO_2t\text{-}Bu$

Preparation of poly(styrene-block-acrylic acid/methacrylic acid) XXV:

A solution of macro-initiator XXIV from the above experiment (41.16 g) in styrene (112.95 g) and toluene (40 ml) was prepared. Copper(I) chloride (2.53 g) was taken in a 500 ml flask and saturated with nitrogen. Toluene (40 ml) was added followed by PMDETA (3.9 ml). The color became dark green indicating the formation of a copper complex. The macro-initiator containing styrene solution was added. The solution was heated to 95° C. for 6 h. The heating was stopped and cooled to room temperature. The reaction mixture was diluted with hexane and filtered through a neutral alumina column to remove the copper complex. The solvents and the excess styrene monomer were removed under reduced pressure. The polymer obtained was dissolved in dichloromethane (200 ml) and mixed with trifluoroacetic acid (180 g). The reaction mixture was stirred at room temperature overnight to hydrolyze the t-butyl group as confirmed by the disappearance of t-butyl group at 1.4 ppm in the proton NMR spectrum. All the volatile materials were removed under reduced pressure and the polymer obtained was dissolved again in tetrahydrofuran (250 ml) and precipitated in cold hexane (1.4 L). The precipitated polymer XXV was collected and dried in vacuum at 70° C. for 48 h to obtain the polymer with blocks of styrene and a mixture of acrylic and methacrylic acids.

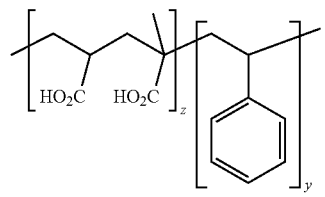

XXV

Preparation of Methacrylic Acid Block XXVI:

Copper(I) bromide (10.39 g) was placed in a 500 ml flask and saturated with nitrogen. Acetone (30 ml) was added followed by N,N,N',N',N'-pentamethyldiethylenetetramine (PMDETA) (13.3 ml). This was stirred to obtain the copper complex. T-butyl methacrylate (252 g) was added. The initiator methyl 2-bromopropionate (MBP) (37 ml) was added. The reaction mixture was cooled to approximately 5° C. and coolant was removed. The mixture was heated to 3 h and cooled. Acetone (500 ml) was added to dilute the polymer solution. The mixture was filtered through a neutral alumina column to remove the copper complex completely. The solvent was removed under low pressure to obtain a mixture of polymer XXVI and unreacted monomer in the ratio of 70:30. Polymer XXVI (macro-initiator mixture) (71 g) was dissolved in toluene (40 ml) along with the styrene monomer (131.6 g) and used for further polymerization below.

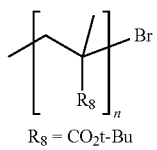

$R_8 = CO_2t\text{-}Bu$

Preparation of poly(styrene-block-methacrylic acid) XXVII:

Copper(I) chloride (4.02 g) was taken in a 500 ml flask and saturated with nitrogen. Toluene (5 ml) was added followed by N,N,N',N',N'-pentamethyldiethylenetetramine (PMDETA) (6.3 ml). The mixture was stirred to obtain the copper complex. The initiator solution containing styrene from the above step was added. The solution was heated to 85° C. for 17 h. The heating was stopped and the solution was cooled to room temperature. The mixture was diluted with toluene (600 ml) and filtered through a neutral alumina column to remove the copper complex. The solvents and the excess styrene monomer were removed under reduced pressure. The polymer obtained was dissolved in dichloromethane (250 ml) and mixed with trifluoroacetic acid (150 ml). The mixture was stirred at room temperature to hydrolyze the t-butyl group as confirmed by the disappearance of t-butyl group at 1.4 ppm in the proton NMR spectrum. The mixture was concentrated and then precipitated in hexane (1.6 L). The precipitated polymer XXVII was collected and dried in vacuum at 85° C. for 48 h to obtain the polymer with blocks of styrene and methacrylic acid.

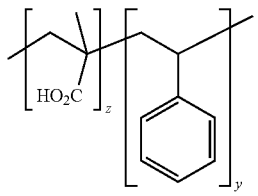

XXVII

Preparation of tri-block copolymer-nanoparticle composition:

A mixture of 60 mg of $TiO_2$ nanoparticles and 60 mg of tri-block copolymer in accordance with XII (prepared from blocks in a manner similar to that described in the preceding paragraphs) in 6 g of cyclohexane was placed in a sonicator for one hour at room temperature. The resulting tri-block copolymer-nanoparticle composition demonstrated particle sizes of 170 nm and zeta potential of −50 MV. The above data indicated that the tri-block copolymer-nanoparticle composition was well dispersed and charged.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims. Furthermore, the foregoing description, for purposes of explanation, used specific nomenclature to provide a thorough understanding of the invention. However, it will be apparent to one skilled in the art that the specific details are not required in order to practice the invention.

Thus, the foregoing descriptions of specific embodiments of the present invention are presented for purposes of illustration and description; they are not intended to be exhaustive or to limit the invention to the precise forms disclosed. Many modifications and variations are possible in view of the above teachings. The embodiments were chosen and described in order to explain the principles of the invention and its practical applications and to thereby enable others skilled in the art to utilize the invention.

What is claimed is:

1. A block copolymer-nanoparticle composition comprising:
    a nanoparticle having bound thereto a copolymer, the copolymer comprising:
    a first block unit that comprises repeating units of a monomer comprising a binding group that is bound to the nanoparticle;
    a second block unit that comprises repeating units of a monomer comprising a hydrophobic moiety that provides steric stabilization of the nanoparticle and homogeneity of mixtures of the copolymer-nanoparticle composition in a non-polar medium; and
    a third block unit that comprises repeating units of a monomer comprising a chargeable group that imparts a charge to the nanoparticle,
    wherein an order of the respective block units in the copolymer and a number of the repeating units of the monomer in the respective block units control the stability, the homogeneity of mixtures and the charge of the nanoparticle in a non-polar medium, and
    wherein the nanoparticle comprises an element selected from the group consisting of Group IIA elements, Group IIB elements, Group IIIA elements, Group IVB elements, Group VB elements and Group VIB elements and combinations thereof and oxides and sulfides thereof.

2. The copolymer-nanoparticle composition of claim 1 having the formula:

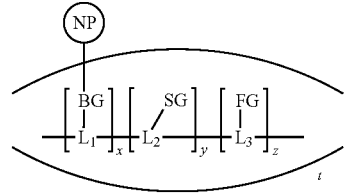

wherein:
    BG is a binding group that binds to the nanoparticle,
    $L_1$, $L_2$ and $L_3$ are each independently a portion of a polymer backbone,
    x, y and z are integers independently between 1 and about 5,000,
    t is an integer between 2 and about 50,
    SG is a hydrophobic moiety that provides steric stabilization and homogeneity of mixtures of the nanoparticle,
    FG is a functional group that is chargeable and imparts a charge to the nanoparticle, and
    NP is a nanoparticle.

3. The copolymer-nanoparticle composition of claim 2, wherein:
    BG is independently selected from the group consisting of primary amines, secondary amines, tertiary amines, amides, nitriles, isonitriles, cyanates, isocyanates, thiocyanates, isothiocyanates, azides, thiols, thiolates, sulfides, sulfinates, sulfonates, phosphates, hydroxyls, alcoholates, phenolates, carbonyls, carboxylates, phosphines, phosphine oxides, phosphonic acids, phosphoramides and phosphates, SG is independently selected from the group consisting of alkyl, substituted alkyl, alkoxy, substituted alkoxy, aryl and substituted aryl, $L_1$, $L_2$ and $L_3$ are each independently selected from the group consisting of:

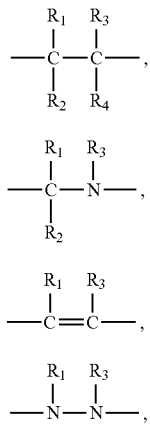

wherein:

$R_1$, $R_2$, $R_3$, $R_4$ are each independently selected from the group consisting of hydrogen, alkyl, substituted alkyl, heteroalkyl, alkyl, substituted alkenyl, heteroalkenyl, alkynyl, substituted alkynyl, heteroalkynyl, aryl, substituted aryl, heteroaryl, wherein at least one of $R_1$, $R_2$, $R_3$ and $R_4$ is BG, SG, or FG, and wherein $R_1$ and $R_3$ in one or more of III, IV and V may be taken together to form a bond, and FG is an acidic functionality or a basic functionality.

4. The copolymer-nanoparticle composition of claim 1 having the formula:

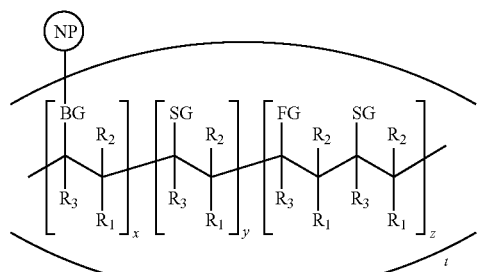

wherein:

BG is a binding group that binds to the nanoparticle, $R_1$, $R_2$ and $R_3$ are each independently selected from the group consisting of hydrogen, alkyl, substituted alkyl, heteroalkyl, alkyl, substituted alkenyl, heteroalkenyl, alkynyl, substituted alkynyl, heteroalkynyl, aryl, substituted aryl, heteroaryl, x, y and z are integers independently between 1 and about 5,000, t is an integer between 2 and about 50, SG is a hydrophobic moiety that provides steric stabilization and homogeneity of mixtures of the nanoparticle, FG is a functional group that is chargeable and imparts a charge to the nanoparticle, and NP is a nanoparticle.

5. The copolymer-nanoparticle composition of claim 1 having the formula:

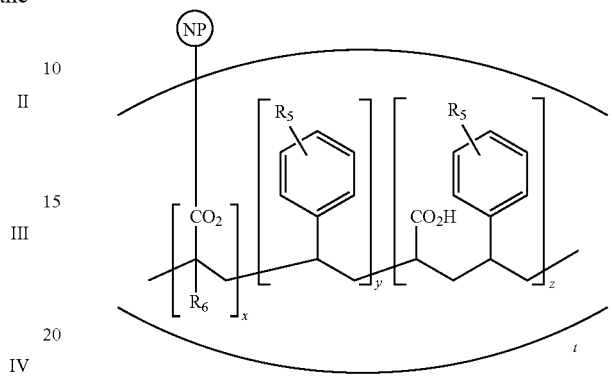

wherein:

$R_5$ are each independently selected from the group consisting of hydrogen, alkyl, substituted alkyl, heteroalkyl, alkyl, substituted alkenyl, heteroalkenyl, alkynyl, substituted alkynyl, heteroalkynyl, aryl, substituted aryl, heteroaryl, wherein more than one $R_5$ may be present on the phenyl ring, x, y and z are integers independently between 1 and about 5,000, t is an integer between 2 and about 50, and $R_6$ is lower alkyl.

6. The copolymer-nanoparticle composition of claim 1 in a homogeneous mixture in a non-polar medium.

7. The copolymer-nanoparticle composition of claim 1, wherein the nanoparticle is selected from the group consisting of $TiO_2$ particles, $ZrO_2$ particles and $HfO_2$ particles.

8. A display device comprising a block copolymer-nanoparticle composition comprising:

a nanoparticle having bound thereto a copolymer, the copolymer comprising:

a first block unit that comprises repeating units of a monomer comprising a binding group that is bound to the nanoparticle;

a second block unit that comprises repeating units of a monomer comprising a hydrophobic moiety that provides steric stabilization of the nanoparticle and homogeneity of mixtures of the copolymer-nanoparticle composition in a non-polar medium; and a third block unit that comprises repeating units of a monomer comprising a chargeable group that imparts a charge to the nanoparticle, wherein an order of the respective block units in the copolymer and a number of the repeating units of the monomer in the respective block units control the stability, the homogeneity of mixtures and the charge of the nanoparticle in a non-polar medium.

9. The display device of claim 8, wherein the nanoparticle comprises an element selected from the group consisting of Group IIA elements, Group IIB elements, Group IIIA elements, Group IVB elements, Group VB elements and Group VIB elements and combinations thereof and oxides and sulfides thereof.

10. A device comprising:
(a) at least two conductive plates, wherein the conductive plates are separately activatable by one or more voltage sources; and
(b) a block copolymer-nanoparticle composition in a non-polar medium between the conductive plates, wherein the block copolymer-nanoparticle composition comprises:
nanoparticles each having bound thereto one or more copolymers, the copolymer comprising:
a first block unit that comprises repeating units of a monomer comprising a binding group that is bound to the nanoparticle;
a second block unit that comprises repeating units of a monomer comprising a hydrophobic moiety that provides steric stabilization of the nanoparticle and homogeneity of mixtures of the polymer-nanoparticle composition in the non-polar medium; and
a third block unit that comprises repeating units of a monomer comprising a chargeable group that imparts a charge to the nanoparticle,
wherein an order of the respective block units in the copolymer and a number of the repeating units of the monomer in the respective block units control the stability, the homogeneity of mixtures and the charge of the nanoparticle in the non-polar medium.

11. The device of claim 10, wherein the nanoparticle comprises an element selected from the group consisting of Group IIA elements, Group IIB elements, Group IIIA elements, Group IVB elements, Group VB elements and Group VIB elements and combinations thereof and oxides and sulfides thereof.

12. A method of controlling stability, homogeneity of mixtures in a non-polar medium and chargeability of a nanoparticle, the method comprising:
combining in a non-polar medium a nanoparticle and a block copolymer, the block copolymer comprising a first block unit that comprises repeating units of a monomer comprising a binding group that binds to the nanoparticle, a second block unit that comprises repeating units of a monomer comprising a hydrophobic moiety that provides steric stabilization and homogeneity of mixtures of the nanoparticle in the non-polar medium, and a third block unit that comprises repeating units of a monomer comprising a chargeable group that imparts a charge to the nanoparticle,
wherein an order of the respective block units in the copolymer and a number of the repeating units of the monomer in the respective block units control the stability, the homogeneity of mixtures and the charge of the nanoparticle, and
wherein the nanoparticle comprises an element selected from the group consisting of Group IIA elements, Group IIB elements, Group IIIA elements, Group IVB elements, Group VB elements and Group VIB elements and combinations thereof and oxides and sulfides thereof.

13. The method of claim 12, wherein the polymer has the formula:

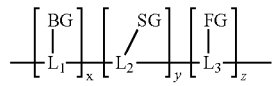

wherein:
BG is a binding group that binds to the nanoparticle,
$L_1$, $L_2$ and $L_3$ are each independently a portion of a polymer backbone,
x, y and z are integers independently between 1 and about 5,000,
SG is a hydrophobic moiety that provides steric stabilization and homogeneity of mixtures of the nanoparticle, and
FG is a functional group that is a chargeable group that imparts a charge to the copolymer.

14. The method of claim 13, wherein:
BG is independently selected from the group consisting of primary amines, secondary amines, tertiary amines, amides, nitriles, isonitriles, cyanates, isocyanates, thiocyanates, isothiocyanates, azides, thiols, thiolates, sulfides, sulfinates, sulfonates, phosphates, hydroxyls, alcoholates, phenolates, carbonyls, carboxylates, phosphines, phosphine oxides, phosphonic acids, phosphoramides and phosphates,
SG is selected from the group consisting of alkyl, substituted alkyl, alkoxy, substituted alkoxy, aryl, substituted aryl, aryloxy, and substituted aryloxy,
$L_1$, $L_2$ and $L_3$ are each independently selected from the group consisting of:

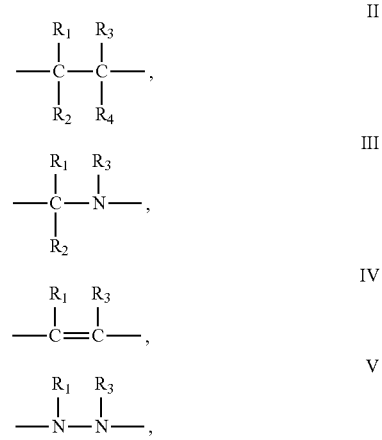

wherein:
$R_1$, $R_2$, $R_3$, $R_4$ are each independently selected from the group consisting of hydrogen, alkyl, substituted alkyl, heteroalkyl, alkyl, substituted alkenyl, heteroalkenyl, alkynyl, substituted alkynyl, heteroalkynyl, aryl, substituted aryl, heteroaryl, wherein at least one of $R_1$, $R_2$, $R_3$ and $R_4$ is BG, SG, or FG, and wherein $R_1$ and $R_3$ in one or more of III, IV and V may be taken together to form a bond, and
FG is an acidic functionality or a basic functionality.

15. The method of claim 14, wherein one or more BG groups are bound to the nanoparticle.

* * * * *